United States Patent
Akami et al.

(10) Patent No.: US 8,001,824 B2
(45) Date of Patent: Aug. 23, 2011

(54) BENDING APPARATUS AND METHOD FOR MANAGING TOOLS, METHOD FOR ARRANGING TOOLS AND METHOD FOR SELECTING TOOL STOCKER

(75) Inventors: Ichio Akami, Isehara (JP); Taketoshi Umemoto, Isehara (JP); Fujihiko Futami, Isehara (JP); Masaaki Sato, Isehara (JP)

(73) Assignee: Amada Co., Ltd., Kanagawa (JP)

( * ) Notice: Subject to any disclaimer, the term of this patent is extended or adjusted under 35 U.S.C. 154(b) by 785 days.

(21) Appl. No.: 11/917,641

(22) PCT Filed: Jun. 9, 2006

(86) PCT No.: PCT/JP2006/312075
§ 371 (c)(1),
(2), (4) Date: Mar. 14, 2008

(87) PCT Pub. No.: WO2006/135030
PCT Pub. Date: Dec. 21, 2006

(65) Prior Publication Data
US 2009/0100896 A1    Apr. 23, 2009

(30) Foreign Application Priority Data

Jun. 15, 2005  (JP) .................................. 2005-175300
Jun. 15, 2005  (JP) .................................. 2005-175567

(51) Int. Cl.
*B21J 13/00*  (2006.01)
*G06F 19/00*  (2011.01)
(52) U.S. Cl. ........... 72/446; 700/165; 700/175; 700/179
(58) Field of Classification Search .......... 72/15.1–15.2, 72/20.1–20.2, 446–448; 700/174, 175, 108, 700/179, 165
See application file for complete search history.

(56) References Cited

U.S. PATENT DOCUMENTS
4,616,322 A * 10/1986 Niwa et al. .................... 700/179
(Continued)

FOREIGN PATENT DOCUMENTS
EP    1160024    12/2001
(Continued)

OTHER PUBLICATIONS

English language Abstract of JP 1-309726.
English language Abstract of JP 61-99529.
Search report from E.P.O., mail date is Nov. 2010.

*Primary Examiner* — Edward Tolan
*Assistant Examiner* — Mohammad Yusuf
(74) *Attorney, Agent, or Firm* — Greenblum & Bernstein P.L.C.

(57) ABSTRACT

A bending apparatus for bending a work using a punch mounted onto an upper table and a die mounted onto a lower table by operation of a ram consisting of the upper table or the lower table includes: a machining information determining means for determining bending sequences, tools, tool layouts, and work positions, based on product information; a tool management database for accumulating numbers of uses of each tool that actually bent the work along with operation of the ram, based on the determined work positions, tools and tool layouts; a number of uses of tool detecting means for detecting number of uses of each mounted tool, referring to the tool management database; and a displaying means for displaying number of uses of relevant predetermined tool, when the detected number of uses of each tool becomes equal or approximate to a durable number of uses, or when a display command signal from a worker side is input.

14 Claims, 27 Drawing Sheets

U.S. PATENT DOCUMENTS

| | | | |
|---|---|---|---|
| 5,485,391 A * | 1/1996 | Lindstrom | 700/175 |
| 5,983,688 A | 11/1999 | Anzai et al. | |
| 6,344,018 B1 * | 2/2002 | Aizawa | 700/179 |
| 6,656,099 B1 | 12/2003 | Akami et al. | |
| 6,937,920 B2 * | 8/2005 | Nishio et al. | 700/165 |

FOREIGN PATENT DOCUMENTS

| | | |
|---|---|---|
| JP | 61-99529 | 5/1986 |
| JP | 1-309726 | 12/1989 |
| WO | 98/01243 | 1/1998 |
| WO | 00/41824 | 7/2000 |

* cited by examiner

FIG.5

BENDING SEQUENCE (1) — 20C2, NUMBER OF USE OF TOOL DETECTING MEANS (20E), ST1, ST2

| | No. | 1 | 2 | 3 | 4 | 5 | 6 | ..... |
|---|---|---|---|---|---|---|---|---|
| STANDARD TOOL | TOOL LENGTH | 100 | 100 | 100 | 100 | 100 | 100 | ..... |
| | NUMBER OF USE | 1 | 1 | 1 | 1 | | | ..... |
| | DURABLE NUMBER OF USE | $G_{100}$ | " | " | " | " | " | ..... |
| SPECIAL TOOL | No. | A1 | A2 | B1 | B2 | C1 | C2 | ..... |
| | TOOL LENGTH | 50 | 50 | 30 | 30 | 15 | 15 | ..... |
| | NUMBER OF USE | | | 1 | | | | ..... |
| | DURABLE NUMBER OF USE | $G_{50}$ | " | $G_{30}$ | " | $G_{15}$ | " | ..... |

(2)

| | No. | 1 | 2 | 3 | 4 | 5 | 6 | ..... |
|---|---|---|---|---|---|---|---|---|
| STANDARD TOOL | TOOL LENGTH | 100 | 100 | 100 | 100 | 100 | 100 | ..... |
| | NUMBER OF USE | 1 | 2 | 2 | 2 | | | ..... |
| | DURABLE NUMBER OF USE | $G_{100}$ | " | " | " | " | " | ..... |
| SPECIAL TOOL | No. | A1 | A2 | B1 | B2 | C1 | C2 | ..... |
| | TOOL LENGTH | 50 | 50 | 30 | 30 | 15 | 15 | ..... |
| | NUMBER OF USE | | | 2 | | | | ..... |
| | DURABLE NUMBER OF USE | $G_{50}$ | " | $G_{30}$ | " | $G_{15}$ | " | ..... |

(4)

| | No. | 1 | 2 | 3 | 4 | 5 | 6 | ..... |
|---|---|---|---|---|---|---|---|---|
| STANDARD TOOL | TOOL LENGTH | 100 | 100 | 100 | 100 | 100 | 100 | ..... |
| | NUMBER OF USE | 1 | 2 | 2 | 2 | 1 | 1 | ..... |
| | DURABLE NUMBER OF USE | $G_{100}$ | " | " | " | " | " | ..... |
| SPECIAL TOOL | No. | A1 | A2 | B1 | B2 | C1 | C2 | ..... |
| | TOOL LENGTH | 50 | 50 | 30 | 30 | 15 | 15 | ..... |
| | NUMBER OF USE | | 2 | 2 | | 2 | | ..... |
| | DURABLE NUMBER OF USE | $G_{50}$ | " | $G_{30}$ | " | $G_{15}$ | " | ..... |

(A) FIRST COMBINATION (20mm+50mm)
$N_{5\sim8} + N_{13} = C_1$ (B) SECOND COMBINATION (25mm+25mm+25mm)
$N_{9\sim11} + N_{9\sim11} + N_{5\sim8} = C_2$ (C) THIRD COMBINATION (15mm+15mm+20mm+20mm)
$N_{1\sim4} + N_{1\sim4} + N_{5\sim8} + N_{5\sim8} = C_3$ (D) FOURTH COMBINATION (15mm+15mm+15mm+25mm)
$N_{1\sim4} + N_{1\sim4} + N_{1\sim4} + N_{9\sim11} = C_4$

FIG.25
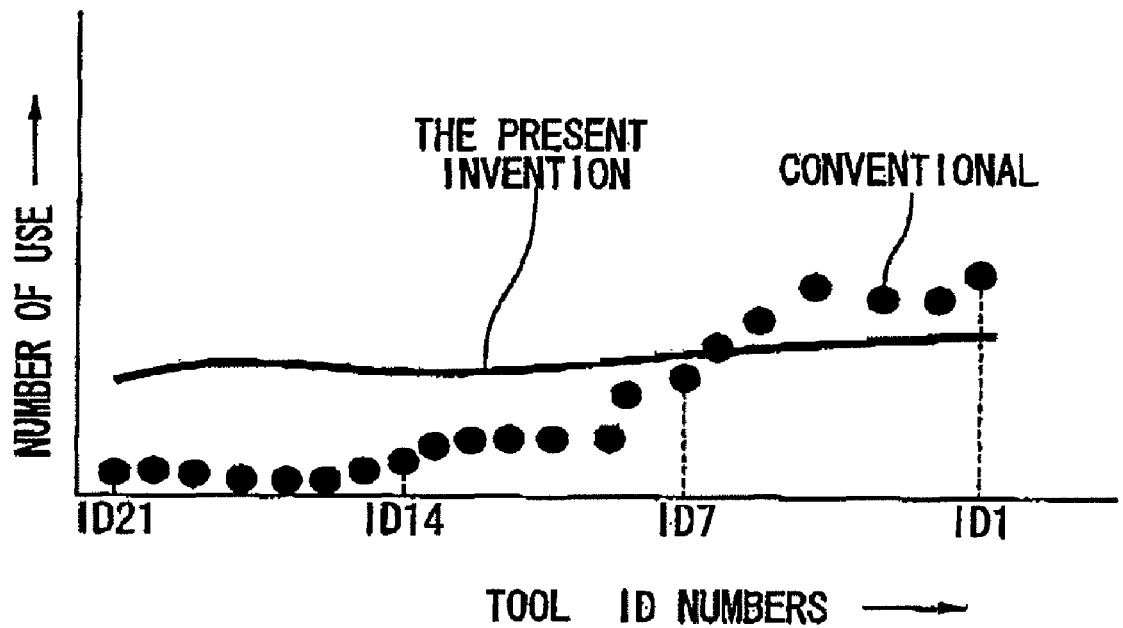
(A) LONG TOOLS
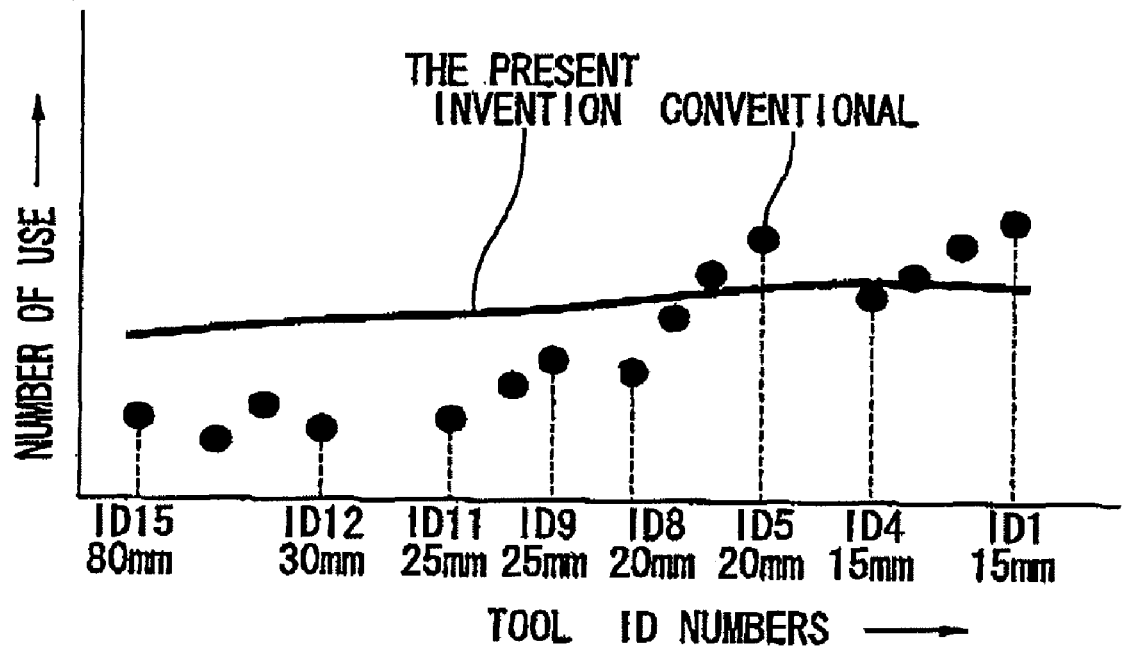
(B) SHORT TOOLS

BENDING APPARATUS AND METHOD FOR MANAGING TOOLS, METHOD FOR ARRANGING TOOLS AND METHOD FOR SELECTING TOOL STOCKER

TECHNICAL FIELD

The present invention relates to a bending apparatus and a method for managing tools which perform bend processing with good integrated uniform accuracy, as well as performing relevant tool management by measuring the number of uses of individual tools that actually bent works, and a bending apparatus having a tool storing section storing a pair of tools consisting of a punch and a die via a stocker and a method for arranging tools and a method for selecting a tool stocker.

BACKGROUND ART (1) Conventionally, in a punch processing machine, there is provided a tool management device as disclosed, for example, in Japanese Patent Application Laid-Open No. 61-99529 (FIG. 1 in the same Gazette).

In this case, the punch processing machine is, for example, a turret punch press (FIG. 2 in the same Gazette), and in a condition that a tool (punch and die) to be used is selected, immediately beneath a ram (striking element), the ram press-strikes the selected tool (punch), thereby the turret press performs punch processing on works.

Each time when aforementioned ram press-strikes a tool, a tool management device of such a turret punch press counts number of uses of the tool and is designed to issue an alarm, when the counted number of use reaches a pre-set durable number of uses.

However, the aforementioned conventional tool management device is dedicated to a punch processing machine, and thus it can not be applied to a press brake as it is.

In other words, in the punch processing machine, as described previously, only tool to be used just now is selected and arranged immediately beneath the ram.

Contrary to this, in the press brake, as illustrated in FIG. 3 of the present application for example, a number of work stations ST1, ST2 ... are formed in a ram (e.g., an upper table 12), and there are metal molds to be used and the ones not to be used depending on bending sequences, among divided tools 1, 2 ..., that constitute respective work stations ST1, ST2, ST3 ....

Accordingly, the number of operations of ran and the number of uses of metal molds are in one-to-one correspondence, in a punch processing machine, whereas they are not in one-to-one correspondence in a press brake.

Thereby, in the punch processing machine, when the ram operates one time to press-strike a tool, the tool is certainly used one time, whereas in the press brake, if the ram is operated one time, the tool mounted on the ram is not necessarily used one time.

For example, in the FIG. 3, in the work station ST2, when a ram 12 operates one time, since a bend line m3 portion of a bending length L3 positioned at a predetermined bending position X3 is machined, in a bending sequence (3), tools A2, C1 that constitute a tool layout c are used each one time.

However, even at the same work station ST2, since a bending line m4 portion of a bending length L4 positioned at a predetermined bending position X4 is machined, in a bending sequence (4), all of tools 5, A2, C1, and 6 constituting a tool layout d, that is, all tools 5, A2, C1, and 6 constituting the tools A2, C1 of the tool layout c used in the bending sequence (3) are used each one time.

For this reason, if a method for managing tools is adopted where each time a ram 12 operates one time, tool is supposed to have been used one time, using the conventional tool management device, there is too big difference from actual number of use, and it becomes quite uncertain which tools were used how many times. As a result, in a press brake, management of metal molds is not fully performed, and it is difficult to grasp wear condition of each tool. When bend processing is performed in such a condition, angles $\alpha$, $\beta$, $\gamma$ along the bend line m portion of a machined work W become unequal to one another, as illustrated in FIG. 8, and integrated uniform accuracy will be deteriorated.

Also, practically, although the number of use of a certain tool does not reach durable number of uses, the tool is sometimes polished by mistake. As a result, waste of working man-hours is produced resulting from low efficiency of tool management and performing extra polishing operation.

(2) Further, as described in the above paragraph (1), in the press brake, unlike a punch processing machine, a tool layout in a work station on the ram is comprised of a plurality of divided tools, and the number of operations of ram and the number of uses of tools do no correspond to one-to-one correspondence. Accordingly, a tool management device as disclosed in the Japanese Patent Application Laid-Open No. 61-99529 can not be applied to the press brake.

Hence, the applicant of the present application filed a patent on Jun. 15, 2005, with respect to a tool management device through a scheme for counting number of uses of each tool that actually bends works (Japanese Patent Application No. 2005-175300).

Then, be it a tool management device as disclosed in the Japanese Patent Application Laid-Open No. 61-99529 or a tool management device as disclosed by the applicant of the present application, in a conventional press brake, for a tool in which number of use does not reach durable number of use, a tool layout is prepared by the next operation.

For example, in the case where the tool layout is prepared in a work station with a length of 470 mm, first, for example, a stocker h1 for long tools with a cross-sectional shape of A within a tool (punch) storing section 2 (FIG. 10) is shifted to the side of upper table 12 (FIG. 26(A)), and subsequently only tools with ID numbers 1 to 4 out of seven tools (identification (ID) numbers 1 to 7) stored within the stocker h1 for long tools are inserted into the upper table 12 side (FIG. 26(A)) by a tool (punch) exchanging device 2A (FIG. 9).

In this condition, by shifting the tools with ID numbers 2 to 4 to left side among the tools that have been inserted into the upper table 12 side (FIG. 26 (B)), a clearance is formed between the tools with ID number 1 and 2.

After that, this time, a stocker t (FIG. 10) for short tools with the same cross-sectional shape of A is shifted to the side of upper table 12 (FIG. 26(C)) in a similar way, and subsequently the tools with ID numbers 5 (20 mm in length) and 13 (50 mm in length) are inserted between the clearance of upper table 12 side.

Finally (FIG. 26 (D)), a tool layout with length of 470 mm can be prepared if clearance is eliminated by putting the tools of upper table 12 side together.

However, a conventional system for selecting tools, as described previously, is a system where, in both stocker h1 for long tools and stocker t for short tools, metal molds are selected in sequence in the increasing order of ID number, and this also applies to a tool storing section 3 (FIG. 11) in which dies are stored.

For this reason, as illustrated in FIG. 25, conventionally, a metal mold with a smaller ID number has a significantly greater number of use compared to that of a larger ID number, thus the proportion that punch's tip and die shoulder are worn becomes larger by the increment of use.

As a result, as illustrated in FIG. 27, angles α, β, γ along the bend line m portion of the machined work W become unequal to one another and bending angles become loose, and thus integrated uniform accuracy becomes deteriorated.

In other words, conventionally, because tools with smaller ID numbers tended to be used frequently (FIG. 25), the wear condition was also nonuniformly heavily produced in the tools with smaller ID numbers, and consequently integrated uniform accuracy was deteriorated.

A first object of the present invention is to provide a bending-apparatus and a method for managing tools that perform relevant tool management by measuring number of uses of individual tools that actually bent-works, as well as performing bend processing with a good integrated uniform accuracy, in order to solve the above-mentioned problem in (1).

A second object of the present invention is to provide a bending apparatus and a method for arranging tools which perform bend processing with a good integrated uniform accuracy by achieving uniformity of wear condition of metal molds and a method for selecting a tool stocker, in order to solve the above-mentioned problem in (2).

DISCLOSURE OF THE INVENTION

The present invention, as described in claim 1 as a First Invention (FIG. 1 to FIG. 7), provides a bending apparatus 1 for bending a work using a punch mounted onto an upper table and a die mounted onto a lower table by operation of a ram consisting of the upper table or the lower table, the apparatus comprising:

a machining information determining means 20D for determining bending sequences (1), (2), (3), and (4), based on product information, as well as determining tools and tool layouts for each of bending sequences (1), (2), (3), and (4), and work positions;

a tool management database 20c2 for accumulating numbers of uses of each tool that actually bent the work w along with operation of a ram 12, based on the determined work positions, tools and tool layouts a, b, c, and d;

a number of uses of tool detecting means 20E for detecting numbers of uses of each mounted tool, referring to the tool management database 20c2; and a displaying means 20F for displaying number of use of relevant predetermined tool, when the detected number of uses of each tool becomes equal or approximate to a durable number of uses $G_{100}$, $G_{50}$, $G_{30}$, and $G_{15}$, number to durable number of uses $G_{100}$, $G_{50}$, $G_{30}$, $G_{15}$, or when a display command signal from a worker side is input; and a method for managing tools that uses the bending apparatus according to claim 1, as described in claim 5, the method comprising the steps of:

(1) determining bending sequences (1), (2), (3), and (4), based on product information, as well as determining tools and tool layouts for each of bending sequences (1), (2), (3), and (4), and work positions, and subsequently;

(2) accumulating numbers of uses of each tool that actually bent the work w along with operation of the ram 12, based on the determined work positions, tools and tool layouts;

(3) detecting the accumulated number of uses of each tool; and (4) displaying number of uses of relevant predetermined tool, when the detected number of uses of each tool becomes equal or approximate to a durable number of uses $G_{100}$, $G_{50}$, $G_{30}$, and $G_{15}$, or when a display command signal from a worker side is input.

With aforementioned configuration of the present invention, according to a first invention (claim 1, claim 5), for example, in each of work stations ST: (FIG. 3), ST2, based on bending lengths L1, L2, L3, and L4 and bending positions X1, X2, X3, and X4 of bend lines m1, m2, m2, and m4 portions of the work W, since tool layouts a, b, c, and d for each of bending sequences (1), (2), (3), and (4) are determined, (in o marks in FIG. 4), if the number of uses of each tool along with operation of the ram 12 is accumulated in the tool management database 20c2 (FIG. 5) including a number of use region of tools that constitute this tool layouts a, b, c, and d, it becomes possible to measure the number of uses of individual tools that actually bent the work W, and consequently it becomes possible to correctly grasp wear condition of each tool, so that an relevant tool management can be performed. As a result, the problem that, as in a conventional manner, tools that practically have not yet reached the durable number of uses were sometimes polished, thus leading to waste of working man-hours will not occur. In addition, as in a conventional manner (FIG. 8), another problem that angles α, β, γ along a bend line m portion of the bent work W become unequal to one another, and integrated uniform accuracy is deteriorated will not occur, and thus, bend processing with an integrated uniform accuracy can be performed.

Also, the present invention provides, as described in claim 7, as a second invention (FIG. 9 to FIG. 25), a bending apparatus 1 having tool storing sections 2, 3 for storing a pair of tools comprised of a punch P and a die D via a stocker, the bending apparatus 1 comprising:

a number of uses of tool detecting means 20E for detecting number of uses of tools P, D within each stocker; and a tool rearranging means 20F for rearranging the tools P, D within each stocker, in a predetermined order, based on the detected number of uses of tools, and as described in claim 9, a bending apparatus 1 having tool storing sections 2, 3 for storing a pair of tools comprised of a punch P and a die D via a stocker, the bending apparatus 1 comprising:

a total sum of number of uses of tools calculating means 20G for calculating total sum of numbers of uses of tools P, D, for each stocker, for each combination of tool groups, or for each of the both; and a metal mold stocker selecting means 20H for selecting a, predetermined stocker, a predetermined combination of tool groups, or the both, based on the calculated total sum of number of uses of tools, and as described in claim 11, a method for arranging tools that uses a bending apparatus 1 according to claim 7, the method comprising the steps of:

(1) detecting a number of uses of tools P, D within each stocker, and subsequently;

(2) rearranging the tools P, D within each stocker in a predetermined order, based on the detected number of uses of the tools; and as described in claim 13, a method for selecting a tool stocker that uses a bending apparatus 1 according to claim 1, the method comprising the steps off:

(1) calculating a total sum of number of uses of tools P, D, for each stocker, for each combination of tool groups, or for each of the both; and subsequently (2) selecting a predetermined stocker, predetermined combination of tool groups, or the both, based on the calculated total sum of number of uses of tools.

With the foregoing configuration of the present invention, a first method (FIG. 19) and a second method (FIG. 21, FIG. 22) are available, as a Second Invention (claim 7, claim 9, claim 11, and claim 13), the foregoing first method (FIG. 19) is carried out on a regular basis, each time when number of operations of a ram 12 (FIG. 9) reaches a predetermined value, and it is a method of rearranging the tools within each of stockers h1 (FIG. 12), h2, h3, and t (FIG. 13) of the tool storing sections 2, 3 in the increasing order of number of use. Also, the foregoing second method (FIG. 21, FIG. 22) is always carried out when a tool layout (e.g., FIG. 23.) with a predetermined length is to be prepared, and it is a method of selecting a stocker (FIG. 21) that exhibits the lowest total sum of numbers of uses of tools, a combination of tool groups that exhibits the lowest total sum of the number of uses of tools, or the both. With these methods, numbers of uses of tools are averaged, compared to conventional method (FIG. 25), and accordingly uniformity of wear condition of tools is achieved, and thereby bend processing with a good integrated uniform accuracy can be performed.

BRIEF DESCRIPTION OF THE DRAWINGS

FIG. 5 is a diagram illustrating a tool management database 20c2 according to the First Invention.

FIG. 25 is a diagram illustrating comparison between the effects of the Second Invention and prior art.

BEST MODES FOR CARRYING OUT THE INVENTION

Hereinafter, the present invention will be described by way of embodiments with reference to the accompanying drawings.

(1) Regarding the First Invention.

Figure 1:
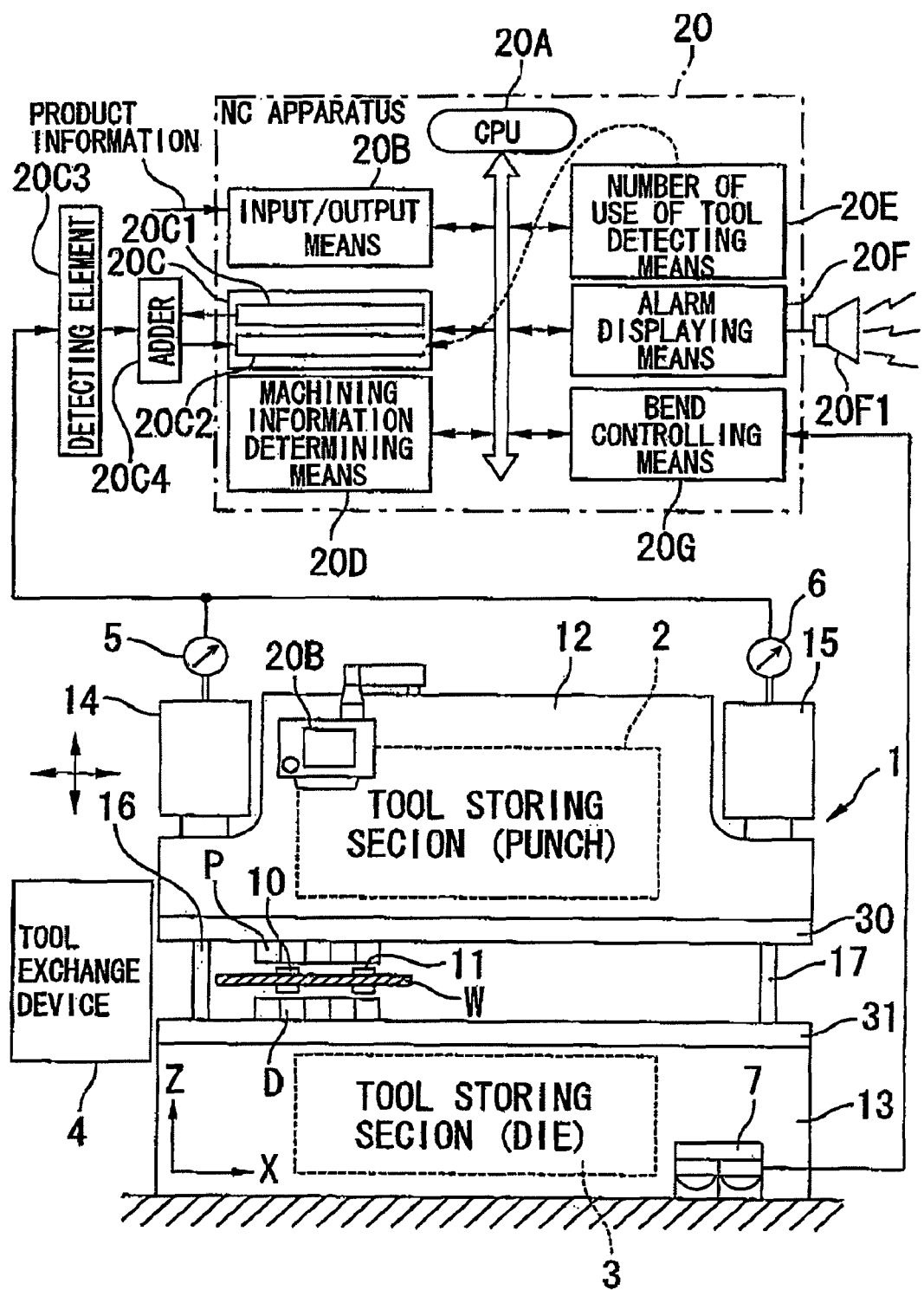
FIG. 1 is a general view of a First Invention.

FIG. 1 is a general view of the First Invention. A bending apparatus 1, as illustrated in FIG. 1, is, for example, a press brake, the press brake 1 has side plates 16, 17 at the both sides of a machine main body, and on the top of the side plates 16, 17, an upper table 12 is mounted via, for example, hydraulic cylinders 14, 15 serving as a ram drive source, and on the upper table 12, a punch F serving as a metal mold at one side is mounted via a punch holder 30. Also, a lower table 13 is arranged under the side plates 16, 17, and on the lower table 13, a die D serving as a metal mold at the other side is mounted via a die holder 31.

That is, a bending apparatus 1 of FIG. 1 is a descending type press brake. After a work W is bumped against bumpers 10, 11 of a back-gauge arranged behind a lower table 13 so that it is to be positioned, if a worker holds a foot pedal 7 down (YES of Step 104 in FIG. 7), so as to activate hydraulic cylinders 14, 15 to allow an upper table 12 serving as a ram to descend (Step 105 of FIG. 7), the work W is bent (Step 106 of FIG. 7) through the cooperation between a punch D and a die D serving as the pair of tools.

Further, a bending robot 21 is provided moveably in right-left direction (x-axis direction) on the front of the foregoing lower table 13 (FIG. 1), the bending robot 21 is designed to feed a work W automatically between the punch D and the die D serving as the pair of tools and to position it, and subsequently to bend the work W.

The foregoing press brake, as illustrated in FIG. 1, is provided with a tool exchanging apparatus 4 moveably in right-left direction (x-axis direction) and up-down direction (z-axis direction) (for example, disclosed in WO00/41824)

Also, behind the upper table 12 and the lower table 13, tool storing sections 2, 3 are provided, and on the respective tool storing sections 2, 3, there are stored divided metal molds with a predetermined length and a predetermined cross-sectional shape that constitute metal mold layouts a, b, c, and d for respective work stations ST1 (FIG. 3), ST2 determined by a machining information determining means 20D to be described later (for example, disclosed in the WO00/41824).

In this case, the foregoing divided tools include, for example, standard (long) tools 1, 2, 3, 4, 5, 6 . . . with a length of 100 mm (FIG. 5), and special (short) tools R1, A2, 31, B2, C1, C2 . . . with lengths of 50 mm, 30 mm, and 15 mm. With this configuration, in the case where actual divided tools are arranged in the respective work station ST1s(FIG. 3), ST2, the following procedure will be followed.

First, a tool exchanging apparatus 4 causes, for example, standard (long) tools 5, 6 to be shifted with no clearance there between from a tool (punch) storing section 2 side to a work station ST2 side, and when the tool exchanging apparatus 4 returns to the tool storing section 2 side, a left-side tool 5 is shifted to left side to some degree, thereby keeping a clearance enough to accommodate special (short) tools A2, C1 to be formed.

In this state, the tool exchanging apparatus 4 causes the special tools A2, C1 to be shifted from the tool storing section 2 side to the work station ST2 side, and to be inserted into the clearance formed before the return, thereby, as illustrated in the figure, a work station ST2 comprised of the standard tools 5, 6 and the special tools A2, C1 is formed.

Next, in a similar way, the tool exchanging apparatus 4 causes standard tools 1, 2, 3, and 4 to be shifted with no clearance there between from the tool storing section 2 side to the work station ST1 side, and when the tool exchanging apparatus 4 returns to the tool storing section 2 side, the left-side tools 1, 2, and 3 are shifted to left side to some degree, thereby keeping a clearance enough to accommodate special tool B1 to be formed.

In this state, the tool exchanging apparatus 4 causes the special tools B1 to be shifted from the tool storing section 2 side to the work station ST1 side, and to be inserted into the clearance formed before the return, thereby, as illustrated in the figure, the work station ST1 comprised of the standard tools 1, 2, 3, and 4 and the special tool B1 is formed.

What is described already is a procedure how to arrange a tool P as a punch on an upper table 12 side within the work stations ST1, ST2, but ditto for a tool D as a die of the lower table 13 side (FIG. 1), that is, the tool exchanging apparatus 4 moves back and forth between the tool (die) storing section 3 and the lower table 13.

Thereby, the tool D is arranged as a die of the lower table 13 side within the work stations ST1, ST2.

Hereinafter, mainly a punch P will be described in detail unless otherwise stated, with respect to the tools P (FIG. 1), D comprised of the divided tools, but ditto for the die D.

An NC apparatus 20 (FIG. 1) of the press brake having the above-mentioned configuration is comprised of CPU20A, input/output means 20B, memory means 20C, machining information determining means 20D, number of uses of tools detecting means 20E, displaying means 20F, and bend controlling means 20G.

CPU24A performs overall control of the entire apparatus as illustrated in FIG. 1, including machining information determining means 20D, number of uses of tools detecting means 20E, displaying means 20F, and the like in accordance with operation procedure (e.g., corresponding to FIG. 7) for implementing the present invention.

The input/output means 20B constitutes an operating panel attached to the press brake, and has input means such as a keyboard or the like, and output means such as a screen or the like, as is well known, and allows product information or the like to be input (Step 101 of FIG. 7), for example, manually or automatically using this operating panel 20B, and allows input results to be confirmed on the screen.

Also, a number-of-use confirmation button is provided on the screen of operating panel 20B (FIG. 1), and as described later (YES for Step 109 in FIG. 7), when a worker depresses this number-of-use confirmation button, numbers of uses of relevant predetermined metal molds are displayed on the screen via displaying means 20F (FIG. 1) (Step 111 in FIG. 7).

In this case, product information is, for example, CAP (Computer Aided Design) information, and includes information such as thickness, material, length of bend line, bending angles, flange dimensions, etc. of the work W (FIG. 2), and these are organized as three-dimensional appearance view, expansion view.

Figure 4:
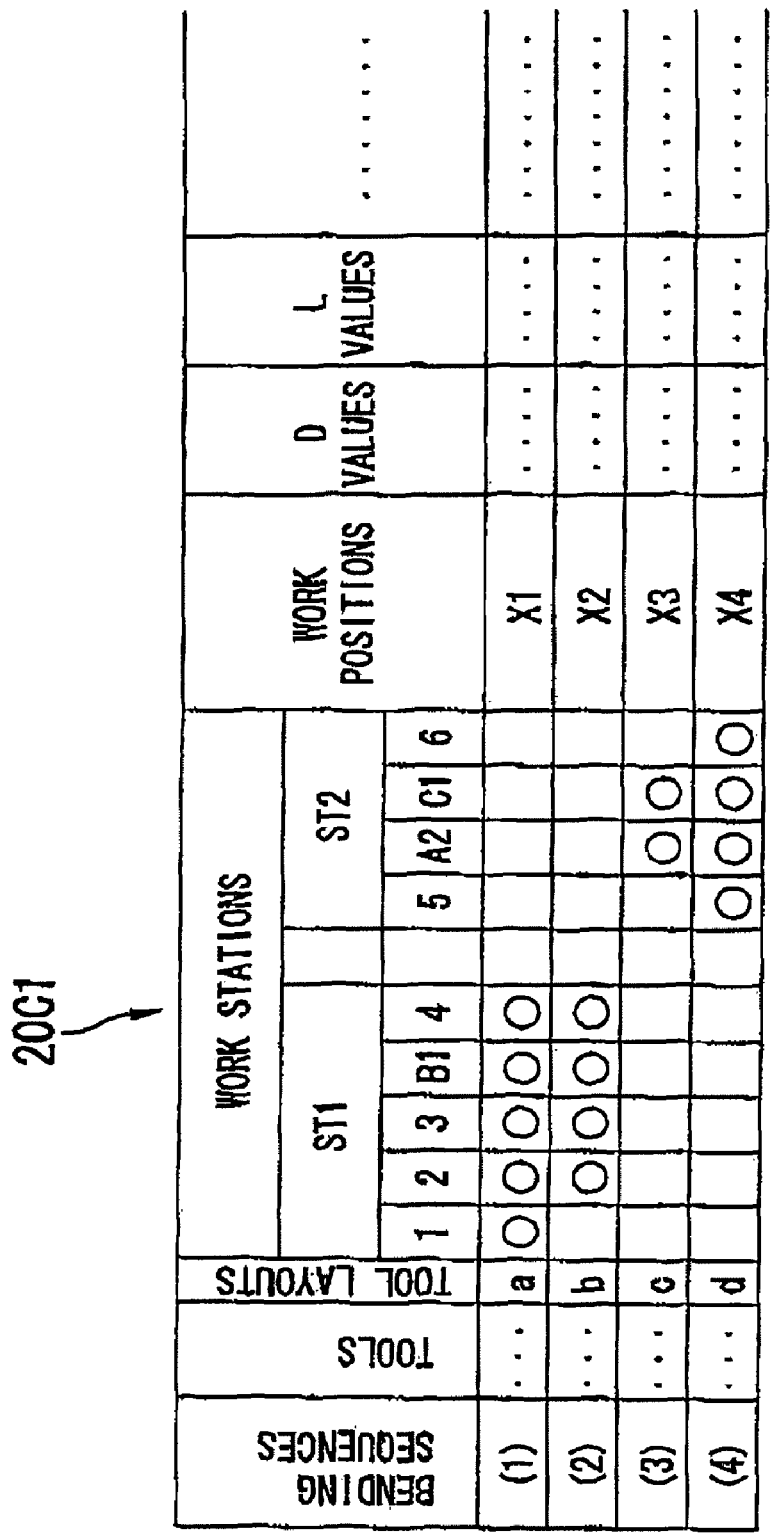
FIG. 4 is a diagram illustrating a machining information database 20c1 according to the First Invention.

Memory means 20C (FIG. 1) stores programs for implementing the present invention, as well as storing as database information necessary for machining, determined by the machining information determining means 20D as described later, such as metal molds for each bending sequence (e.g., divided tools having predetermined length (right-left direction (x-axis direction)), predetermined cross-sectional shapes (gooseneck-shaped, straight sword-shaped, etc.)), tool layouts, work positions, other D values, L values, etc. (FIG. 4).

Also, the memory means 20C (FIG. 1) stores, a region (FIG. 5) where actual numbers of uses of standard tools 1, 2 . . . , and special tools A1, A2 . . . stored in, as described previously, for example, the tool storing section 2 are accumulated, as the tool management database 20c2.

Figure 7:
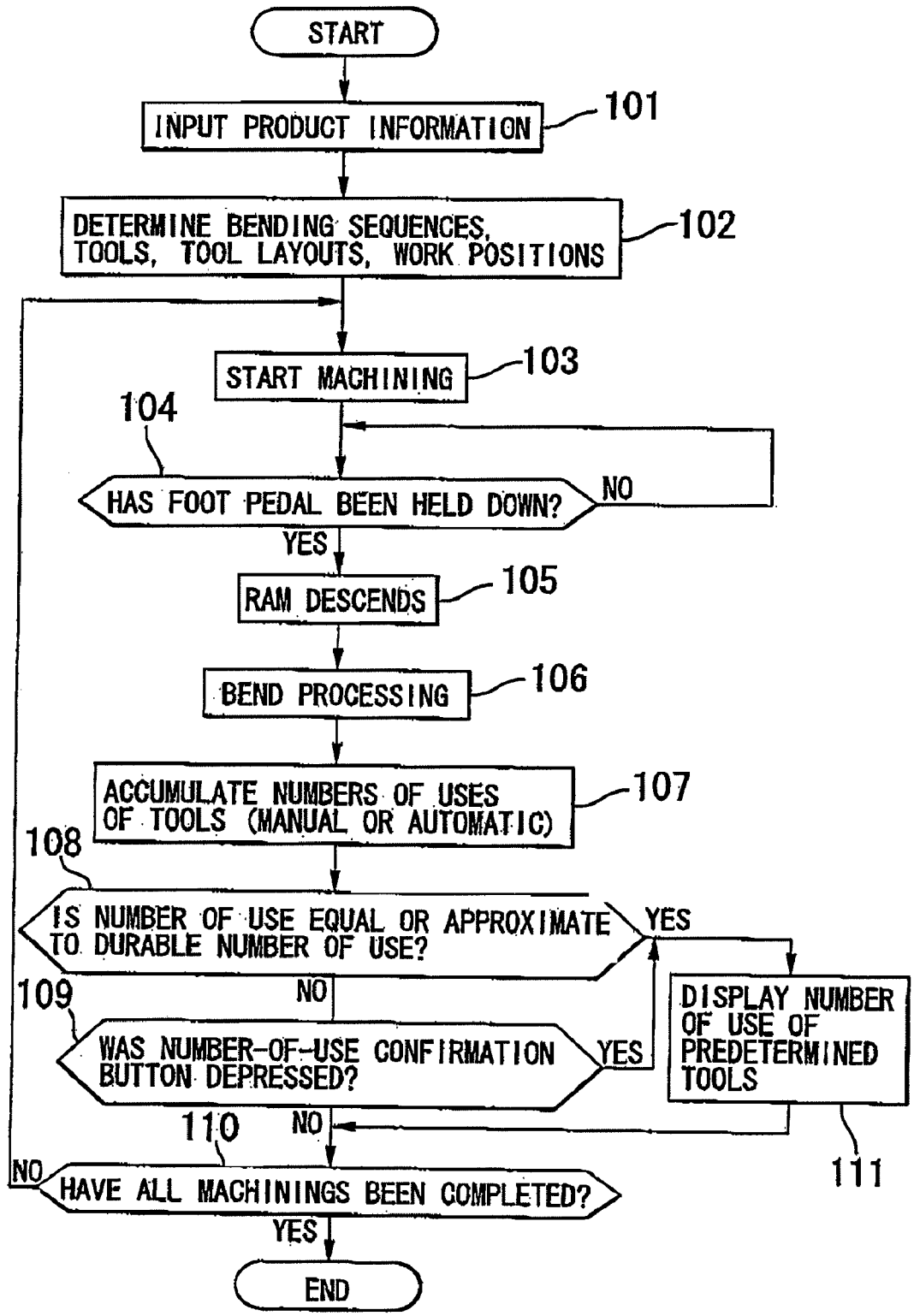
FIG. 7 is a flowchart for illustrating an operation of the First Invention.
Figure 8:
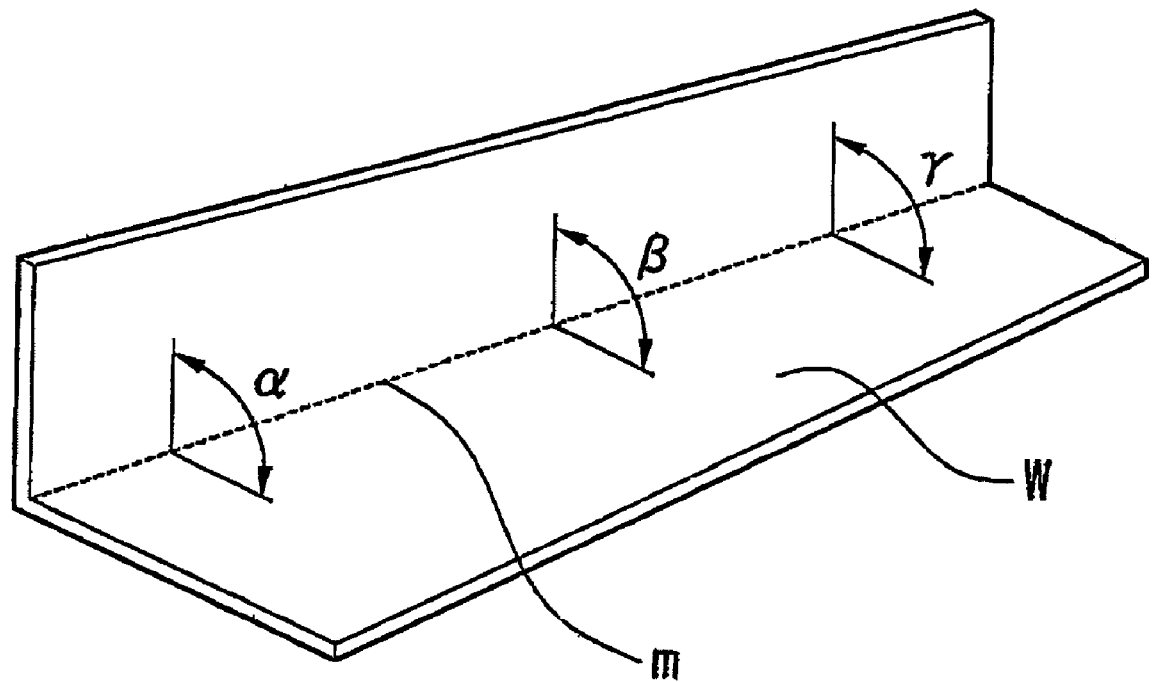
FIG. 8 is an explanatory view of prior art of the First Invention.

Then, actual numbers of uses of tools (numbers of uses of tools that actually bent the works W) are accumulated in this tool management database 20c2 during bend processing (Step 106 in FIG. 7).

Therefore, in the case where the number of uses of tools detecting means 20E (FIG. 1) detects that the actual numbers of uses of tools are equal to durable numbers of uses $G_{100}$, $G_{50}$, $G_{30}$, $G_{15}$ (YES of Step 108 in FIG. 7), or in a similar case, referring to this tool management database 20c2 (FIG. 5), numbers of uses of relevant predetermined tools are displayed (Step 111 in FIG. 7) via displaying means 20 (FIG. 1) as described later.

The machining information determining means 20D (FIG. 1) determines bending sequence (1), (2), (3), and (4), based on product information input via the input/output means 20B, as well as determining tools that bends works W for each bending sequence and tool layouts a, b, c, and d, work positions (right-left direction), other D values, L values, etc., (Steps 101 and 102 in FIG. 7).

Figure 2:
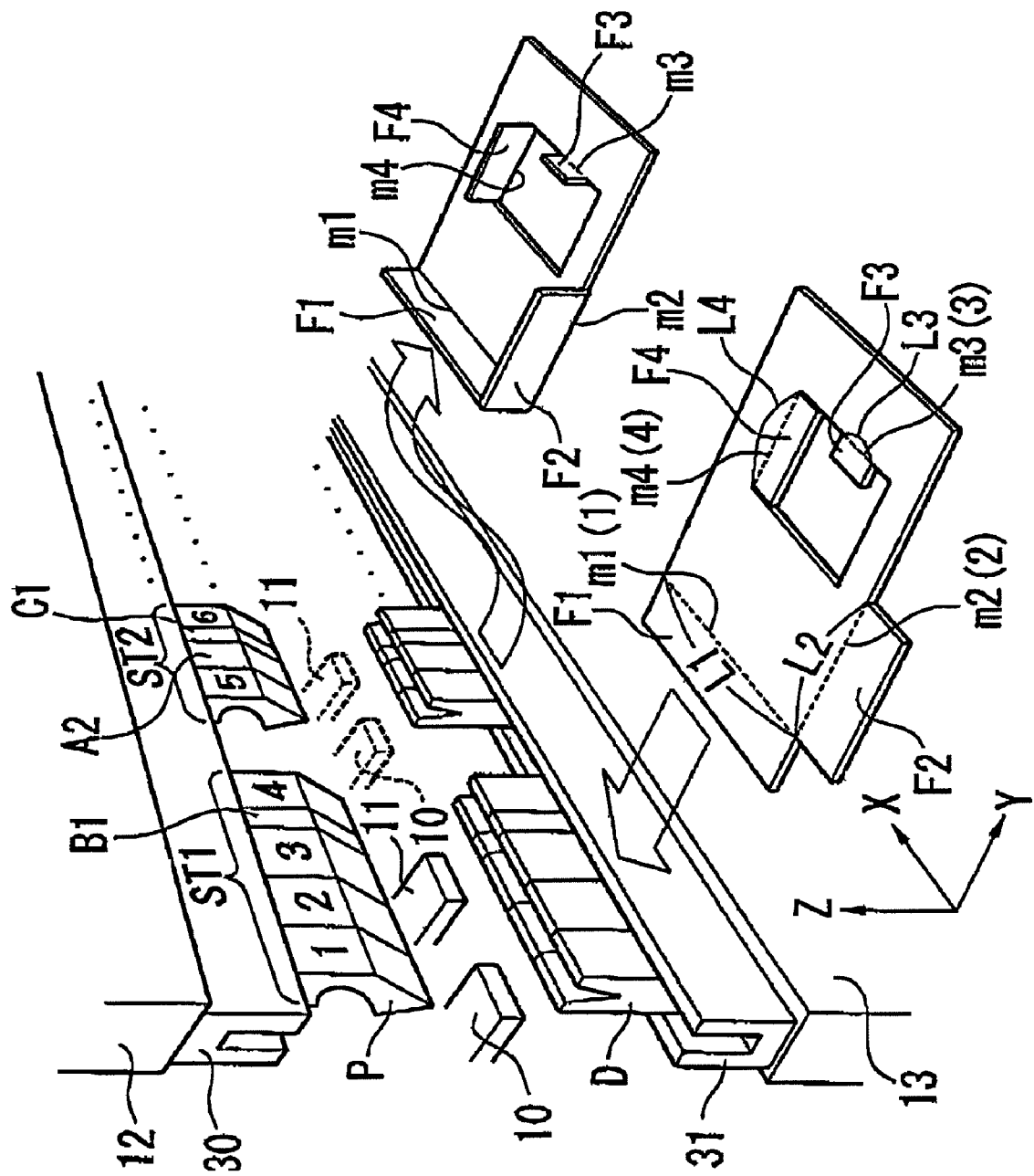
FIG. 2 is a view illustrating an example of bending according to the First Invention.

For example, as illustrated in FIG. 2, bend lines m1, m2, m3, and m4 portions of a flat work W are bent in the order of (1), (2), (3), and (4), and finally, as illustrated in the figure, a, product with flanges F1, F2, F3, and F4 being erected is machined (e.g. as disclosed in WO98/01243 (particularly FIG. 3 to FIG. 5)).

In this case, a bend length L1 of a bend line m1 portion is the longest, the next longest is a bend length L2 of a bend line m2 portion, but heights of flanges F1, F2 obtained by bending the both bend lines m1, m2 portions are designed to be equal.

In the other hand, a bend length L3 of a bend line m3 portion is the shortest, the next shortest is a bend length L4 of a bend line m4 portion, but heights of flange F3, F4 obtained by bending the both bend lines m3, m4 portions are designed to be equal and to be lower than the heights of the flanges F1, F2.

Based on product information containing such information, the machining information determining means 20D (FIG. 1) determines bending sequence, determines tools and tool layouts a, b, c, and d for each bending sequence, and determines work positions.

First, the machining information determining means 20D determines a work station ST1 consisting of standard tools 1, 2, 3, and 4 and special tool B1 in accordance with the longest bend length L1 that the bend line m1 portion (FIG. 3) has.

Next, the machining information determining means 20D determines (fixes) bending sequence (1), on condition that bending is possible in this work station ST1, and tools, and a tool layout a of bending sequence (1) are determined, based on the bend length L1 and bending position X1 of the bend line m1 portion.

That is, a bend line m1 portion (FIG. 2) in the first bending sequence (1) has not interference with flanges or the like of work W, depending on metal molds that constitute a work station ST1, even if the bend line m1 portion is inserted and bent between a punch P and a die D as it is, and therefore it is possible to bend.

Thereby, bending sequence (1) is determined, and with respect to the determined bending sequence (1), metal molds comprised of divided tools (standard tools 1, 2, 3, and 4, and special tool B1) with predetermined length, a predetermined cross-sectional shape that constitute a work station ST1 are determined, and a tool layout a is determined, which is an arrangement where the divided tools are arranged at predetermined positions.

The metal mold layout a in this case, as illustrated, refers to an arrangement of standard tools 1, 2, and 3, special tool B1, and standard tool 4 placed in a line in the order from left-end to right-end.

Also, if the flange F1 (FIG. 3) obtained by bending a bend line m1 portion in the bending sequence (1) is shifted to the outside of work station ST1, bend line m2 portion in bending sequence (2) has no interference with a work W, depending on tools that constitute the work station ST1, at bend length L2 and bending position X2 as shown within the work station ST1, and therefore the bend line m2 portion is able to be bent.

Thereby, the bending sequence (2) is determined, and for this determined bending sequence (2), there are determined, tools consisting of divided tools with predetermined length, predetermined cross-sectional shapes (standard tools 2, 3, and 4 and special tool B1), out of tools that constitute the work station ST1, and the tool layout b that is an arrangement of the divided tools arranged at predetermined positions is determined.

The tool layout b in this case refers to an arrangement of standard tools 2, 3, special tool B1, and standard tool 4 placed in a line in the order from left-end skipping over a standard tool 1 positioned at left-end of the work station ST1 to right-end.

Bend lines m3, m4 portions of bending sequences (3), (4), as apparent from FIG. 2, are not able to be bent, caused by interference with a work W, depending on, tools that constitute the work station ST1.

Also, a tools for bending the bend line m3 portion can be substituted by tool for bending longer bend length m4 portion.

Therefore, there is determined a work station ST2 in accordance with the bend length L4 of longer bend line m4 portion.

Figure 3:
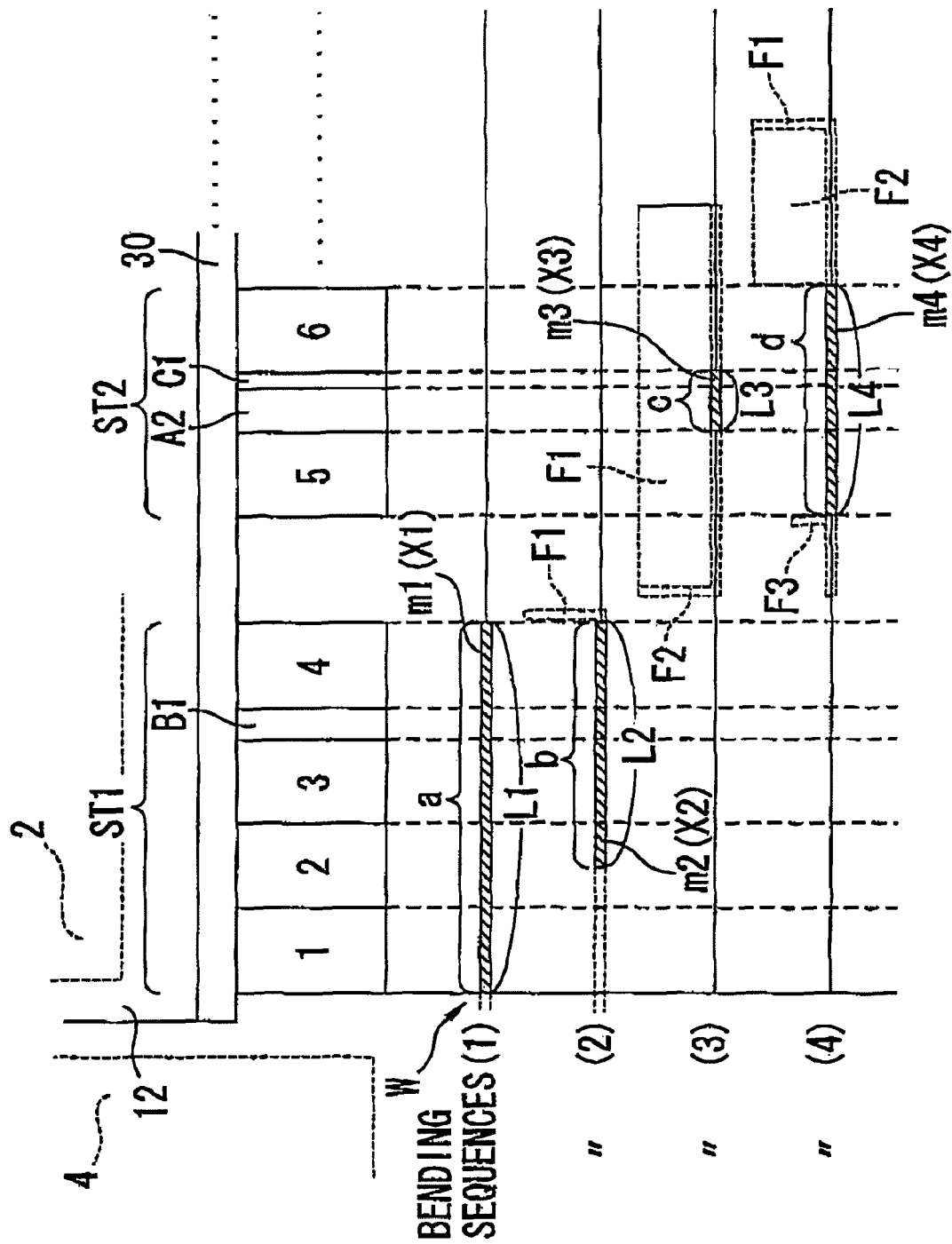
FIG. 3 is a diagram illustrating a relationship between a tool layout and a bend position of work according to the First Invention.

That is, as illustrated in FIG. 3, there is determined a work station ST2 in accordance with the bend line L4 by standard tools 5, 6 and special tools A2, C1.

Then, a bending sequence (3) is determined in this work station ST2, and for this determined bending sequence (3), tools consisting of divided tools with predetermined length, predetermined cross-sectional shapes (special tools A2, C1) out of tools that constitute the work station ST2 are determined, and then a tool layout c that is an arrangement of the divided tools arranged at predetermined positions is determined.

The tool layout c in this case refers to an arrangement of special tools A2, C1 placed in a line skipping over a standard tool 5 positioned at left-end of a work station ST2, in the order from left-end to right-end in the substantially center of the work station ST2.

Also, a bending sequence (4) is determined in this work station ST2, and for this determined bending sequence (4), there are determined tools consisting of divided tools with predetermined length, predetermined cross-sectional shapes (standard tools 5, 6, special tools A2, C1), which represent all the tools that constitute a work station ST2, and a tool layout d that is an arrangement of the divided tools arranged at predetermined positions is determined.

The tool layout d in this case refers to an arrangement of standard tool 5, special tools A2, C1, standard tool 6 placed in a line in the order from left-end to right-end of work station ST2.

That is, the machining information determining means 20D (FIG. 1) determines the bending sequences (1), (2), (3), and (4) on condition that it is possible to bend a work W, based on bending lengths and bending positions of bend line portions of work, in each of work stations ST1 (FIG. 3), ST2.

Then, the machining information determining means 20D (FIG. 1) determines tools comprised of divided tools with predetermined lengths, predetermined cross-sectional shapes, which bend a work w for each bending sequence, in each of work stations ST1 (FIG. 3), ST2, and tool layouts a, b, c, and d, respectively, which are arrangements of the divided tools arranged at predetermined positions.

Further, the machining information determining means 20D (FIG. 1) determines work positions X1, X2, X3, and X4, based on bending positions X1, X2, X3, and X4 of bend lines m1, m2, m3, and m4 portions having predetermined bending lengths L1, L2, L3, and L4 in each of work stations ST1 (FIG. 3), ST2.

In other words, the machining information determining means 20D (FIG. 1) determines the work positions X1, X2, x3, and X4, by judging where to arrange bend lines m1, m2, m3, and m4 portions having predetermined bend lengths L1, L2, L3, and L4 in a work W for each of work stations ST1 (FIG. 3), ST2.

Thus, bending sequences (1), (2), (3), and (4) determined by the machining information determining means 20D (FIG. 1), and metal molds for each bending sequence, and metal mold layouts a, b, c, and d, work positions, other D values, L values, etc. are stored in the memory means 20c (FIG. 1) as machining information database 20c1 (FIG. 4).

In this machining information database 20c1 (FIG. 4), marks denote metal molds (divided metal molds as described previously) that bend work for each of bending sequences (1), (2), (3), and (4), and arrangements of tools with these marks correspond to tool layouts a, b, c, and d as described previously.

On the other hand, the number of uses of tools detecting means 20E (FIG. 1) detects number of uses of respective tools, referring to a tool management database 20c2.

The tool management database 20c2 (FIG. 5) in this case is a region where there are accumulated numbers of uses of respective tools that actually bent works W along with operations of the ram 12, based on work positions X1, X2, X3, and X4 at tool layouts a, b, c, and d of respective work stations ST1, ST2, as illustrated in FIG. 3, and it is provided, for example, in the memory means 20c (FIG. 1).

This metal mold management database 20c2 (FIG. 5), as illustrated, is divided into regions for standard tools, and regions for special tools, and respective regions are separated into No., tool length, number of use, and durable number of uses.

In this case, to simplify description, it is assumed that tools that constitute tool layouts a, b, c, and d of respective work stations ST1, ST2 as described previously (FIG. 3) are quite new, and not yet used even once.

Accordingly, regions for number of uses in the tool management database 20c2 (FIG. 5) that constitute standard tools and special tools are all cleared initially.

Also, the tool management database 20c2 contains regions for not only standard tools 1, 2, 3, 4, 5, and 6, and special tools A2, B1, and C1 as described in the FIG. 3, but also secures regions, for example, for tools that are stored in the tool storing portion 2 (FIG. 1) and scheduled to be used from now onward.

Then, as will be apparent from comparison between FIG. 3 and FIG. 5, actual tools (FIG. 3) mounted onto a press brake, and tools as data in tool management database 20c2 (FIG. 5) are in one-to-one correspondence, with respect to the tools that make up respective work stations ST1, ST2.

Therefore, the number of uses of tools detecting means 20E can detect numbers of uses of respective tools that actually bent works W by referring to this tool management database 20c2 (FIG. 5) during bend processing (Step 106 in FIG. 7).

For example, as illustrated in FIG. 3, all the metal molds that make up the tool layout a in work station ST1 are used, from the fact that bend line m1 portion is bent in bending sequence (1).

In this case, actual use of the tools can be detected from actual bending of the work w by the relevant tools (FIG. 1) (tools have come to contact with work W, or tools have received reaction force from work W).

For example, when a worker holds a foot pedal 7 down, bend controlling means 20G detects it and activates hydraulic cylinders 14, 15, thereby causing the ran 12 to descend, and when a tool comes into contact with work W, or receives reaction force from work W, then the readings of pressure gauges 5, 6 connected to hydraulic cylinders 14, 15 will rise.

Accordingly, when a detecting element 20c3 detects change in readings of the pressure gauges 5, 6, relevant tool is regarded to have been used, for example, in the case of bending sequence (1) (FIG. 3, FIG. 4), standard tools 1, 2, 3, and 4, and special tool E1 are used each one time along with operation of the ram 12, via an adder 20c4 (FIG. 1), and consequently "1" is added to relevant region of the tool management database 20c2 (FIG. 5).

In this case, which tools are used for each of the bending sequences (1), (2), (3), and (4) can be found from tool layouts a, b, c, and d (corresponds to o marks in FIG. 3), determined by the machining information determining means 20D (FIG. 1) based on FIG. 3 as described previously.

The adder 20c4 can detect which tool has been used, while monitoring the machining information database 20c1, each time when a detection signal is received from the detecting element 20c3. Accordingly, the adder 20c4 (FIG. 1) adds "1" to relevant region of tool management database 20c2 (FIG. 5), as described previously.

In this case, as will be apparent from FIG. 3, not only the cases where bend line portions of work W come into contact with total length of each tool (e.g. bending sequences (1), (3), and (4)), but also the cases where the work W contacts with substantially one half (½) of total length (e.g., in bending sequence (2), bend line m2 portion is in contact with substantially on half (½) of standard tool 2), thus "1" can be assigned to all numbers of uses for these cases.

The aforementioned example of FIG. 5 is based on this concept, and if bend line portion of work contacts even a part of each tool, number of use is regarded to be "1", then "1" is added to relevant region of the tool management database 20c2 via the adder 20c4 (FIG. 1).

Accordingly, in FIG. 5, at a stage when bending sequence (4) is complete, as will be apparent from comparison with FIG. 4 (total number of o marks of each tool), regarding accumulated values of numbers of uses for standard tools 1, 2, 3, 4, 5, and 6, tools 1, 5, and 6 were used one time, and tools 2, 3, and 4 were used two times, and special tools A2, B1, and C1 were all used two times.

In FIG. 3, however, in the case where the bend line portion of work W as described previously contacts substantially one half (½) of total length of tool (case of bending sequence (2)), 0.5 may be assigned to number of use, and further "0" may be assigned (regarded as non-used).

Figure 6:
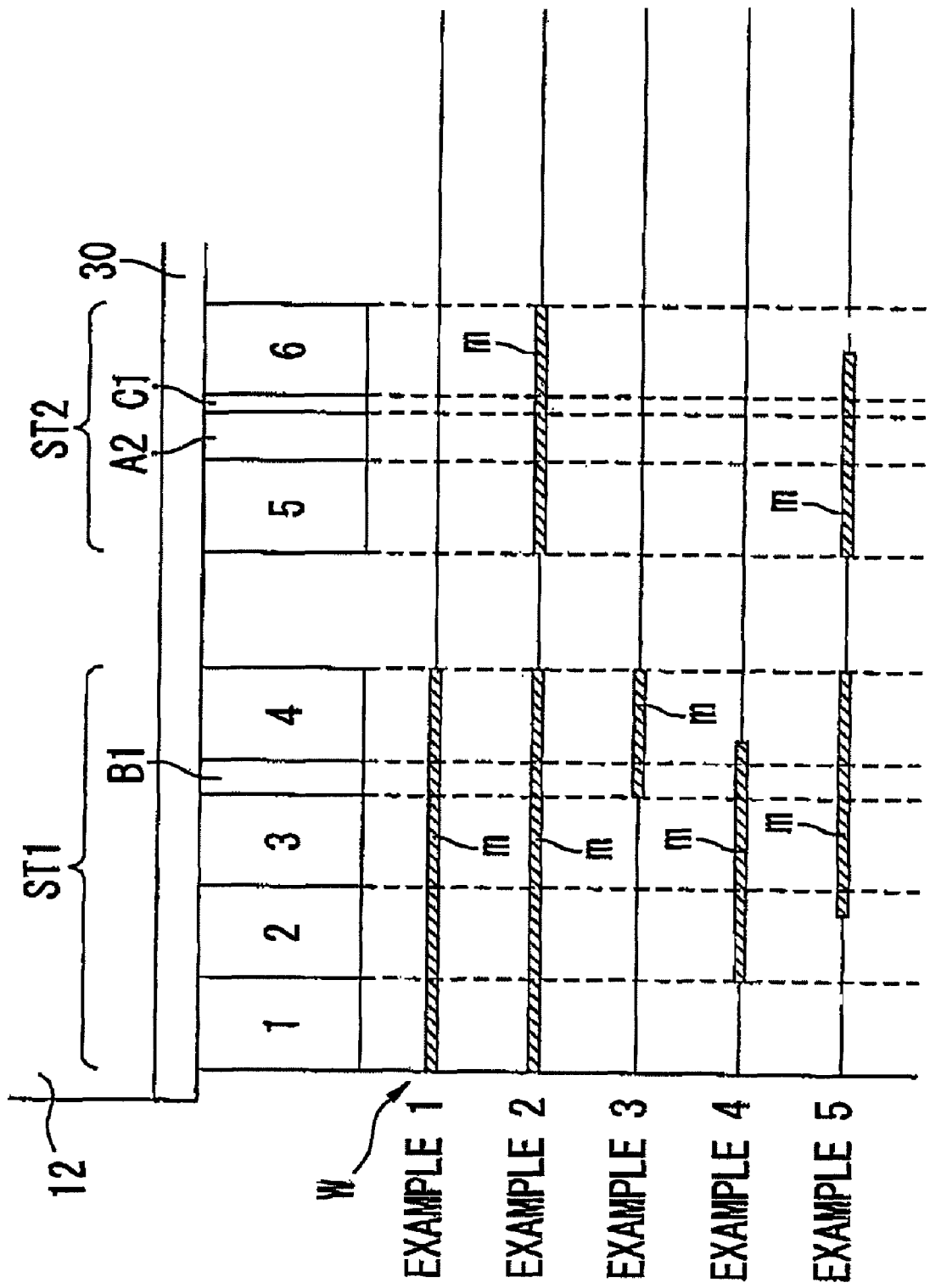
FIG. 6 is a diagram illustrating procedure how to measure number of uses of tools according to the First Invention.

In other cases, in FIG. 6 illustrating an example of how to measure numbers of uses of tools, in Example 1 to Example 3, any of bend line m portions of work W contacts total length of tool; in Example 4 contacts approximately one third (⅓) of standard tool 4; in Example 5 contacts approximately one half (½) of standard tool 6.

In this case, as described before, "1" may be assigned to all numbers of uses of tools, or "1" may be assigned to only the cases of total contact (Example 1 to Example 3); 0.3, 0.5 may be assigned to the cases of partial contact (Example 4, Example 5), respectively; alternatively "0" may be assigned to the both cases, respectively.

In this way, a procedure how to measure numbers of uses of tools is arbitrary, and thus a worker may preset it.

For example, at a stage when machining information such as tool layout has been determined (Step 102 in FIG. 7), a worker can set a procedure how to measure numbers of uses of tools to the adder 20c4 via the input/output means 20B (FIG. 1), prior to machining (step 103 in FIG. 7).

Examples as described above, are the cases where the detecting element 20c3 detects change in readings of pressure gauges 85, 6 (FIG. 1), thereby numbers of uses of metal molds are automatically accumulated in the tool management database 20c2 (FIG. 5) via the adder 20c4.

However, if tool layouts a, b, c, and d (b marks in FIG. 3) for each of bending sequences (1), (2), (3), and (4) determined by the machining information determining means 20D are displayed, for example, on-a screen of the operating panel 20B (FIG. 1), a worker can mount tools manually, while watching this, and at the same time can accumulate manually numbers of uses of tools in the tool management database 20c2 (FIG. 5) (in particular, effective in the case where the tool exchanging device 4 (FIG. 1) is not installed).

Displaying means 20F (FIG. 1) displays numbers of uses of relevant predetermined tool (YES of Step 108 through Step 111 in FIG. 7), when number of uses of tool detecting means 20E detects that numbers of uses of each tool are equal or approximate to durable numbers of uses $G_{100}$, $G_{50}$, $G_{30}$, and $G_{15}$, as the result of having referred to the tool management database 20c2 (FIG. 5).

This is a display that is automatically operated, and is performed on a screen of the operating panel 20B.

However, the present invention is not limited to this, there is available a display that is manually operated, and as described before, when a worker depresses a number-of-use confirmation button provided on the screen of the operating panel 20B, a display command signal is input into the displaying means 20F, thereby the displaying means 20F displays numbers of uses of relevant predetermined metal molds in a similar manner on the screen of the operating panel 20B (YES of Step 109 through Step 111 in FIG. 7).

Thereby, a worker can confirm tool usage based on one's own judgment, and more adequate tool management can be performed.

In the case where a work W is bent by the already described bending robot 21 (FIG. 1), for example, during a period between completion of machining of a product A and starting of machining of the next product B, that is, during a period between jobs, number of uses of the predetermined tools are kept being displayed on the screen of the operating panel 20B, thereby a worker can confirm tool usage by watching this display.

When a foot pedal 7 is held down, as already described, bend controlling means 20G (FIG. 1) detects it and activates hydraulic cylinders 11, 15, and causes a ram 12 to descend, and prior to machining, activates tool exchanging means 4, as already described (FIG. 3), forms work station ST1, ST2, and further positions in advance bumpers 10, 11 of a back gauge at a predetermined position.

Hereinafter, operation of the First Invention having the above-mentioned configuration will be described according to FIG. 7.

(1) Operation until machining information is determined.

In Step 101 in FIG. 7, product information is input, and in Step 012, bending sequences, tools, tool layouts, work positions, etc. will be determined.

That is, CPU20A (FIG. 1), when it detects that product information has been input via input/output means 20n, determines bending sequences, tools, tool layouts a, b, c, and d, work positions, etc. via machining information determining means 20D, and subsequently causes memory means 20c (FIG. 1) to store these machining information as database (FIG. 4).

Then, prior to machining in advance, CPU20A (FIG. 1) causes bend controlling means 20G (FIG. 1) to activate metal mold exchanging means 4, and forms work stations ST1, ST2 (FIG. 3) comprised of divided tools with predetermined lengths and predetermined cross-sectional shapes, and machining is started in a state where bumpers 10, 11 of a back gauge are transferred to predetermined positions.

(2) Operation after machining is started.

When machining is started, in Stop 103 in the FIG. 7, and if foot pedal 7 is held down (YES), in Step 104, the ram 12 is caused to descend, and bending is performed in Step 106, and then numbers of uses of tools are accumulated in Step 107.

That is, CPU20A (FIG. 1), when detecting that machining information has been determined by the machining information determining means 20D, regards it as start of machining.

Then, when CPU20A detects that, for example, the worker has positioned the work w by bumping it into bumpers 10, 11, with reference to work positions among machining information (FIG. 4) displayed on a screen of the operating panel 20B, and subsequently the worker has held a foot pedal 7 down, it activates hydraulic cylinders 14, 15, causes the ram 12 to descend, and first of all, thus bending the work W for bending sequence (1) (FIG. 4) via the bend controlling means 20G (FIG. 1).

At the same time, CPU20A (FIG. 1), for example, activates a detecting element 20c3 and an adder 20c4, causes the abovementioned tool management database 20c2 (FIG. 5) to accumulate numbers of uses of respective tools to be used in bending sequence (1).

Next, in Step 108 in FIG. 7, CPU20A judges whether or not number of uses of each metal mold is equal or approximate to durable number of uses, or in Step 109 in FIG. 7, whether or not number-of-use confirmation button has been pressed.

That is, CPU20A (FIG. 1) judges via the number of use of tool detecting means 20E whether number of use of each tool is equal or approximate to the durable number of uses $G_{100}$, $G_{50}$, $G_{30}$, and $G_{15}$, referring to the tool management database 20c2 (FIG. 5), and in the case of NO for bending sequence (1) (NO of Step 108 in FIG. 7, NO of Step 109), judges whether all processes (in the order of bending) have been completed or not (Step 110 in FIG. 7).

In the case of having not yet completed (NO of Step 110 in FIG. 7), the same operation will be performed for the next bending sequence (2) returning to Step 103.

Thus, in the case where cPU20A (FIG. 1) judges via the number of use of tool detecting means 20E that number of use of each tool is equal to durable number of uses $G_{100}$, $G_{50}$, $G_{30}$, and $G_{15}$, or in a similar case (YES of Step 108 in FIG. 7, YES of Step 109), as the result that the same operation has been performed for bending sequences (1), (2), (3), and (4), causes the displaying means 20F (FIG. 1) to display number of use of relevant predetermined metal mold (Step 111 in FIG. 7).

In the operational description, there was described in detail the case where the metal mold exchanging means 4 (FIG. 1) is installed, work stations ST1 (FIG. 3), ST2 are formed automatically, and accumulation of numbers of uses of tools in relation to tool management database 20c2 (FIG. 5) is automatically performed using detecting element 20c3 (FIG. 1) and adder 20c4.

As a matter of course, the present invention, however, is not limited to this, as already described, but also applied to the case where tool exchanging means 4 (FIG. 1) is not placed, work stations ST1 (FIG. 3), ST2 are formed manually, and accumulation of numbers of uses of tools in relation to the metal mold management database 20c2 (FIG. 5) is manually performed, and exhibits the same actions and effects as the case where automatically done.

(2) Regarding the Second Invention.

Figure 9:
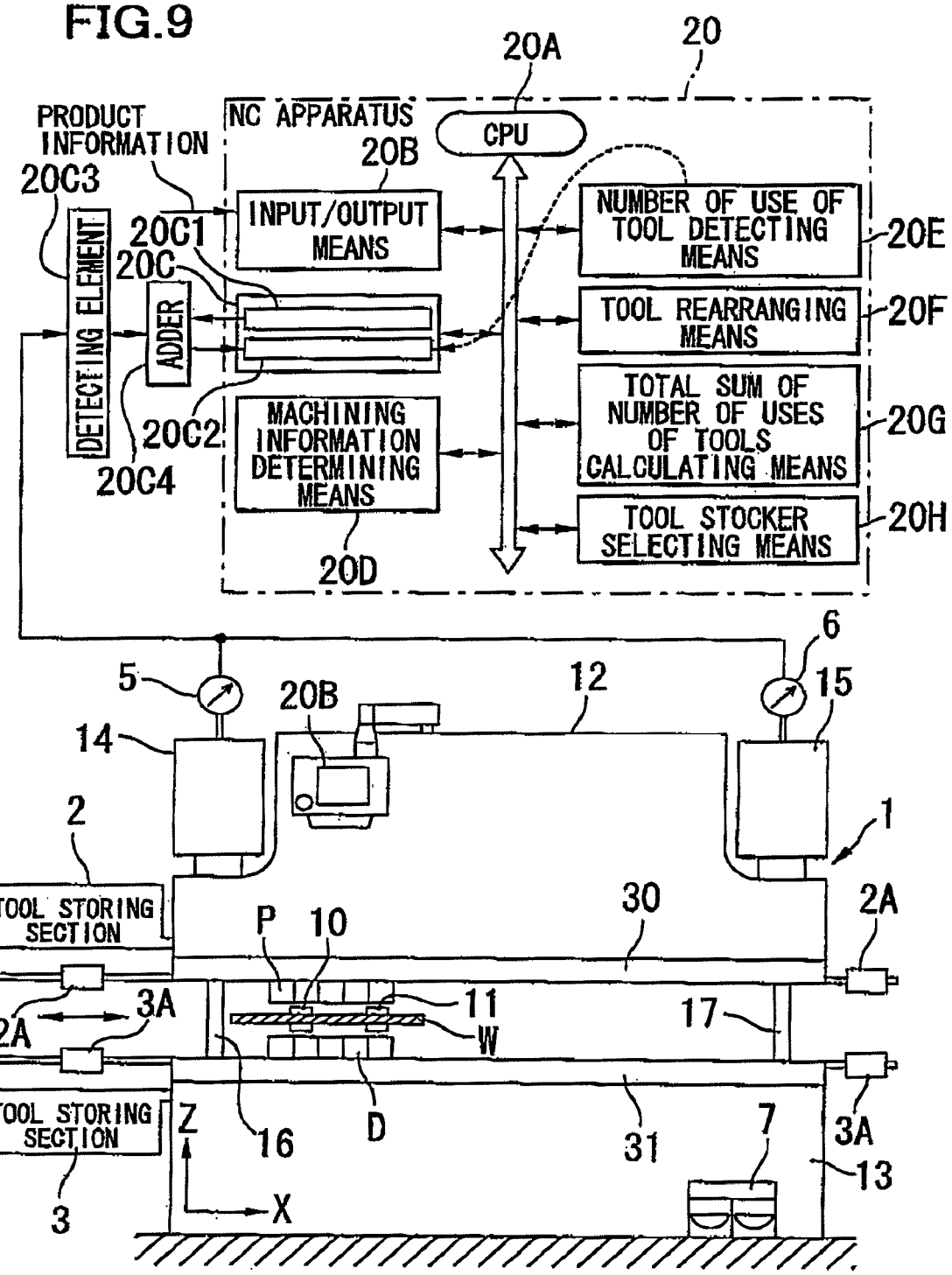
FIG. 9 is a general view of a Second Invention.

FIG. 9 is a general view of the Second Invention. A bending apparatus 1 as illustrated in FIG. 9 is, similarly, for example, a press brake; the press brake 1 has side plates 16, 17 at the both sides of machine main body; an upper table 12 is attached on the side plates 16, 17 via hydraulic cylinders 14, 15 serving as ram drive source; a punch P serving as one metal mold is mounted onto the upper table 12 via a punch holder 30.

Also, similarly, a lower table 13 is arranged under the side plates 16, 17; a die D serving as the other metal mold is mounted onto the lower table 13 via a die holder 31.

With this configuration, after a work W is positioned by bumping it into bumpers 10, 11 of back gauge arranged behind the lower table 13, if a worker holds a foot pedal 7 down, for example, thereby activating hydraulic cylinders 14, 15, and causing the upper table 12 serving as a ram to descend, the work W is bent through cooperation between the punch P and die D serving as the pair of tools.

At the side of the upper table 12 and lower table 13, as illustrated in FIG. 9, tool storing sections 2, 3 and tool exchanging means 2A, 3A are installed (e.g., as disclosed in WO00/41824).

In this case, divided tools consisting of long tools and short tools with predetermined lengths, predetermined cross-sectional shapes are stored in the respective metal mold storing sections 2, 3, via stockers (e.g., as disclosed in WO00/41824).

Figure 10:
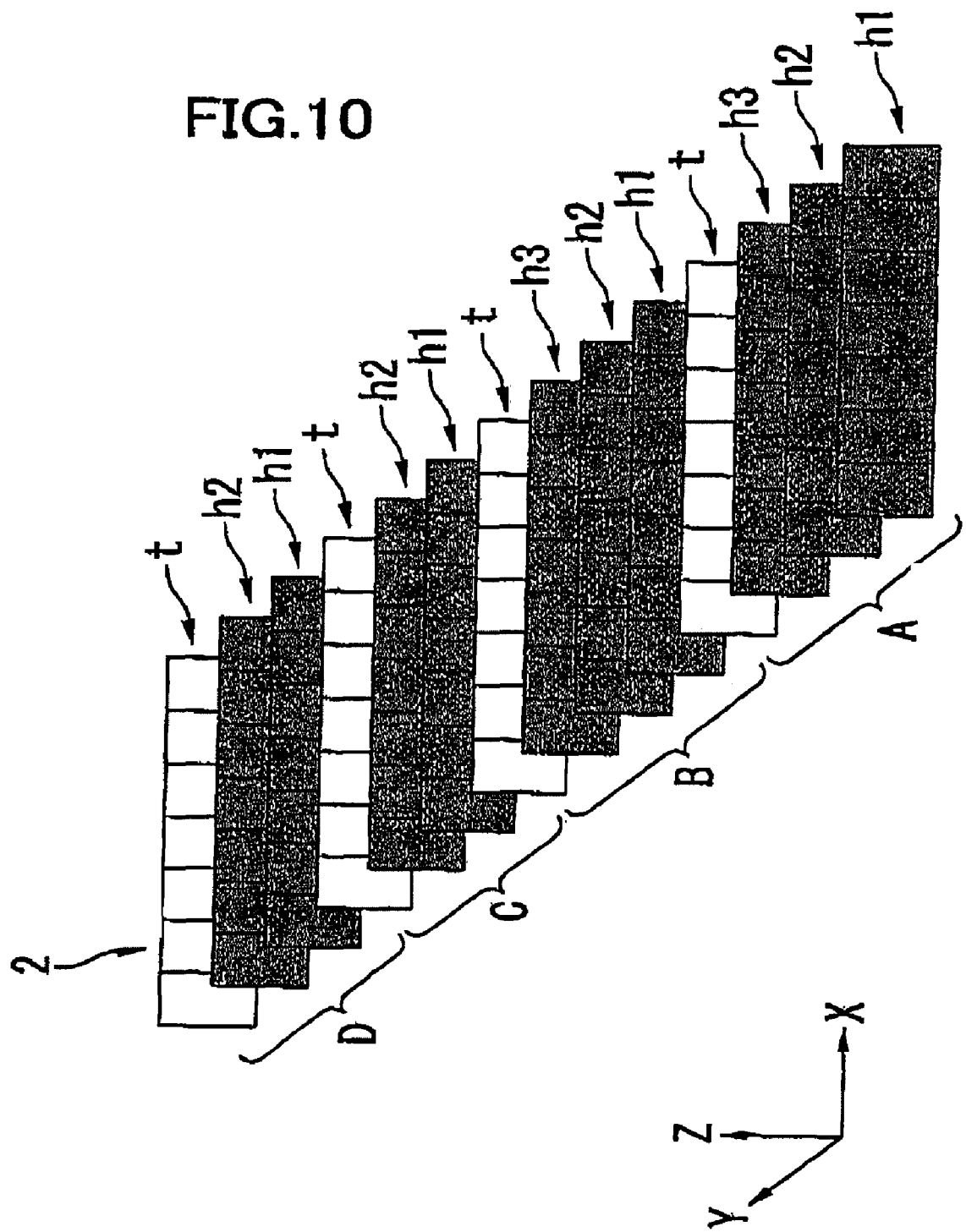
FIG. 10 is a diagram illustrating an arrangement of each stocker in a tool (punch) storing section 2 that constitutes the Second Invention.

For example, tool (punch) storing sections 2, as illustrated in FIG. 10, is divided into four regions from A to D for each of tools with the same cross-sectional shape (e.g., straight sword-shaped, gooseneck-shaped, or the like), and stockers for long tools and stockers for short tools are arranged in sequence from the closest to upper table 12 (FIG. 9) in each region.

That is, in a region A (FIG. 10), three stockers h1, h2, and h3 for long tools and one stocker t for short tools; in a region B, three stockers h1, h2, and h3 for long tools and one stocker t for short tools; in a region C, two stockers h1, h2 for long tools and one stocker t for short tools; in a region D, two stockers h1, h2 for long tools and one stocker t for short tools; 14 sets of stockers are arranged in total.

Figure 12:
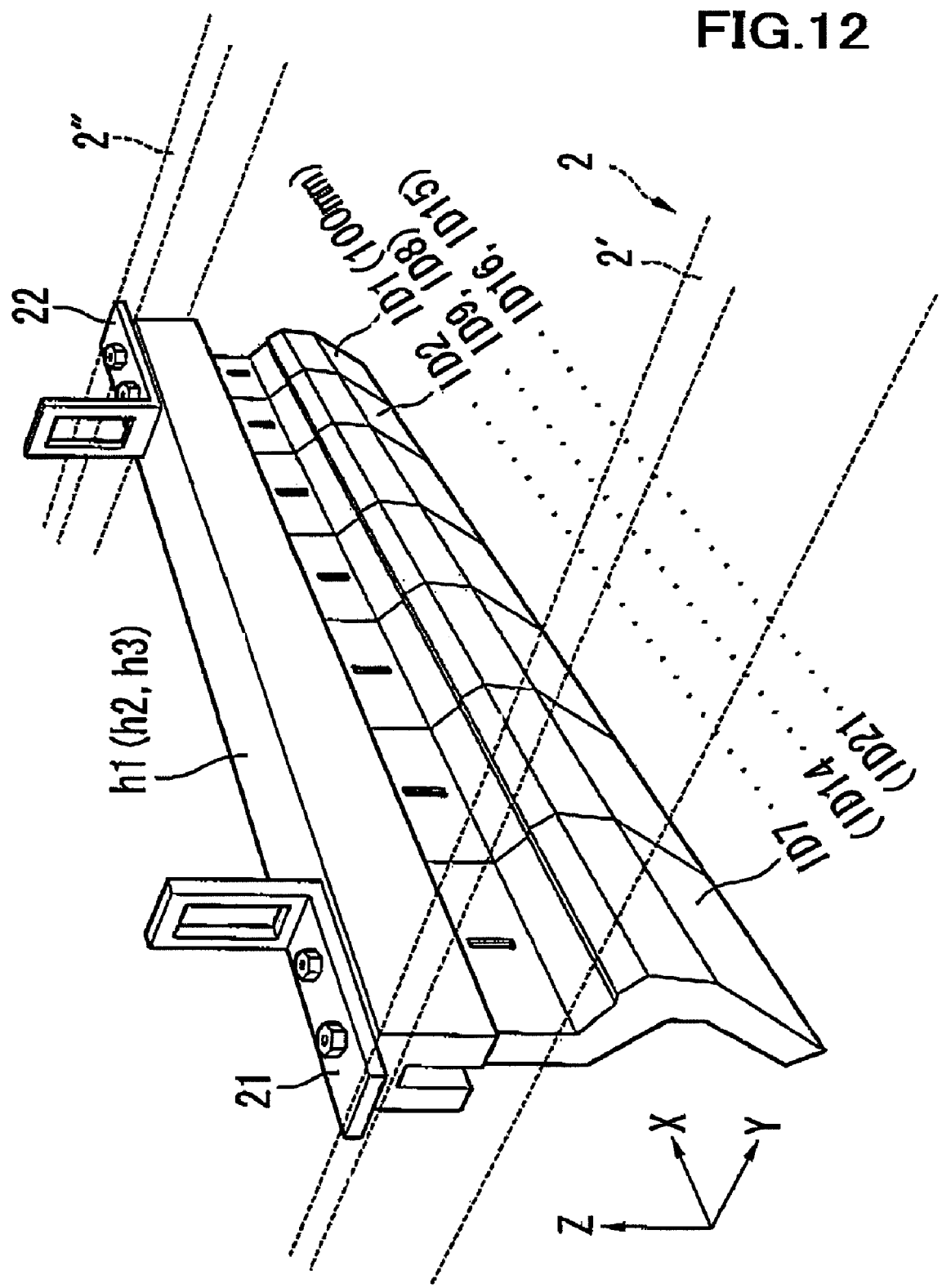
FIG. 12 is a view illustrating stockers h1, h2, and h3 for long tools according to the Second Invention.

Among these, a stocker h1 (h2, h3) for long tools, as is well known, has the same construction as a tool (punch) holder 30 of upper table 12 side (FIG. 9), and as illustrated in FIG. 12, it can be supported by frames 2', 2" of the tool storing section 2 via brackets 21, 22 at both ends.

Onto this stocker h1 (h2, h3) for long tools, as illustrated, for example, there are mounted seven pieces of long tools with length (x-direction) of 10100 mm, ID number 1 to 7 (ID number 8 to 14, ID number 15 to 21).

That is, onto stocker h1 (h2, h3) for long tools, there are mounted long tools with smaller ID number closer to upper table 12; long tools with larger ID number far from upper table 12, respectively.

Figure 13:
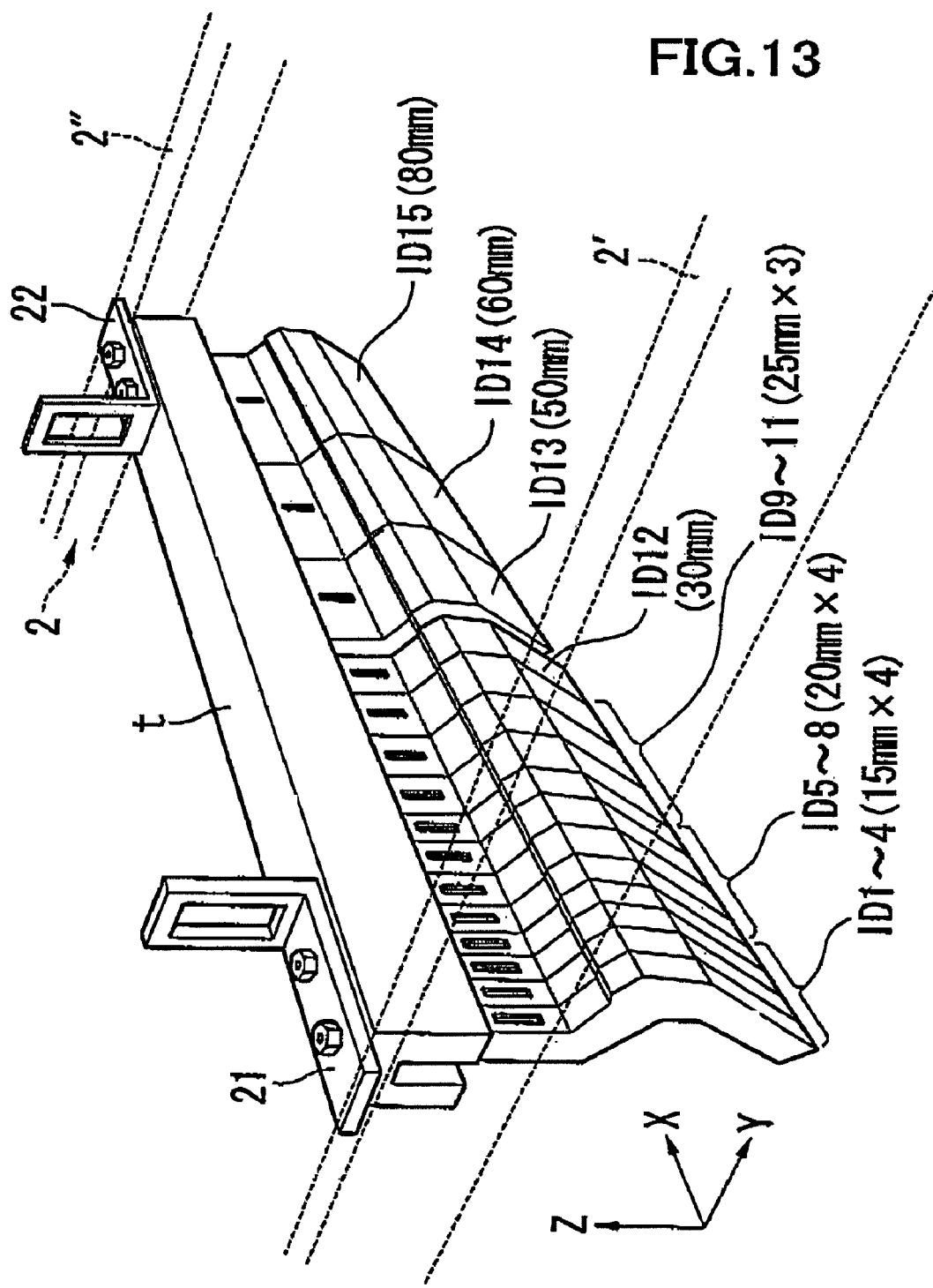
FIG. 13 is a view illustrating a stocker t for short tools according to the Second Invention.

In addition, a stocker t for short tools, similarly, has also the same construction as the tool (punch) holder 30 of upper table 12 side (FIG. 9), and as illustrated in FIG. 13, can be supported by the frames 2', 2" of the tool storing section 2 via the brackets 21, 22 at the both ends.

Onto this stocker t for short tools, as illustrated, for example, there are mounted four pieces of short tools with length (x-direction) of 15 mm, ID number 1 to 4; four pieces of short tools with 20 mm, ID number 5 to 8, three pieces of short tools with 25 mm, ID number 9 to 11; one piece of short length tool with 30 mm, ID number 12; one piece of short tool with 50 mm, ID number 13; one piece of short tool with 60 mm, ID number 14; and one piece of short tool with 80 mm, ID number 15, respectively.

That is, onto stocker t for short tools, there are mounted short tools with larger ID number closer to upper table 12; short tools with smaller ID number far from upper table 12, respectively.

The description above is associated with configuration of the tool storing section 2 (FIG. 10) at punch-side, stockers h1, h2, and h3 for long tools at punch side and stocker t for short tools (FIG. 13), but ditto for the tool storing section 3 (FIG. 11) at die side.

Figure 11:
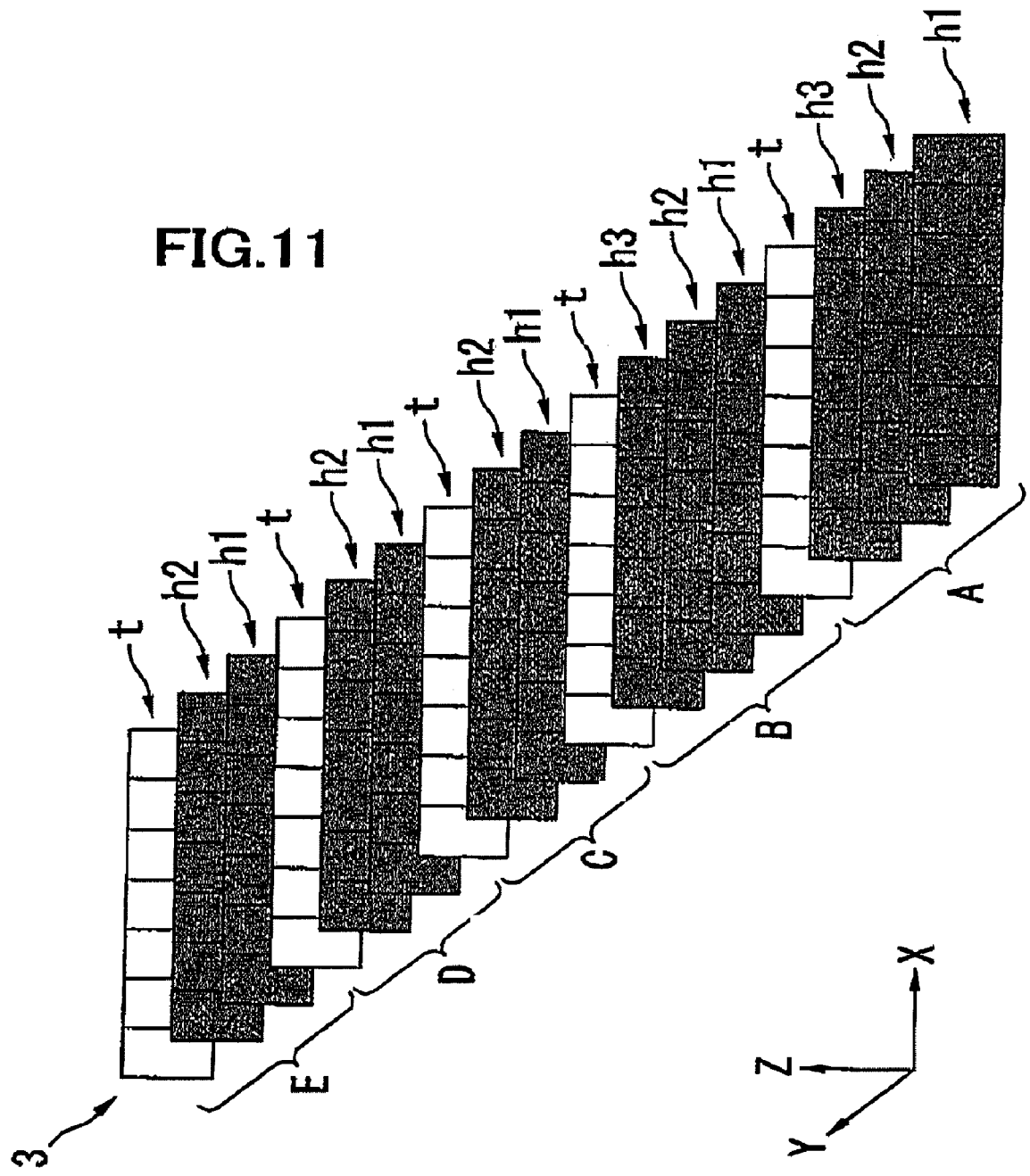
FIG. 11 is a diagram illustrating an arrangement of each stocker in a tool (die) storing section 3 that constitutes the Second Invention.

Also, for the description hereinafter, to simplify description, tools at punch side (especially punch tool in A region) stored in the tool storing section 2 (FIG. 10) will be described in detail, but ditto for tools in other B to D regions, or die tools stored in the tool storing section 3 (FIG. 11).

With this configuration, conventionally, for both stockers h1 (FIG. 12), h2, and h3 for long tools, and stocker t for short tools (FIG. 13), as already described (FIG. 25), tools with smaller ID number were frequently used, and therefore number of uses was unbalanced.

Figure 19:
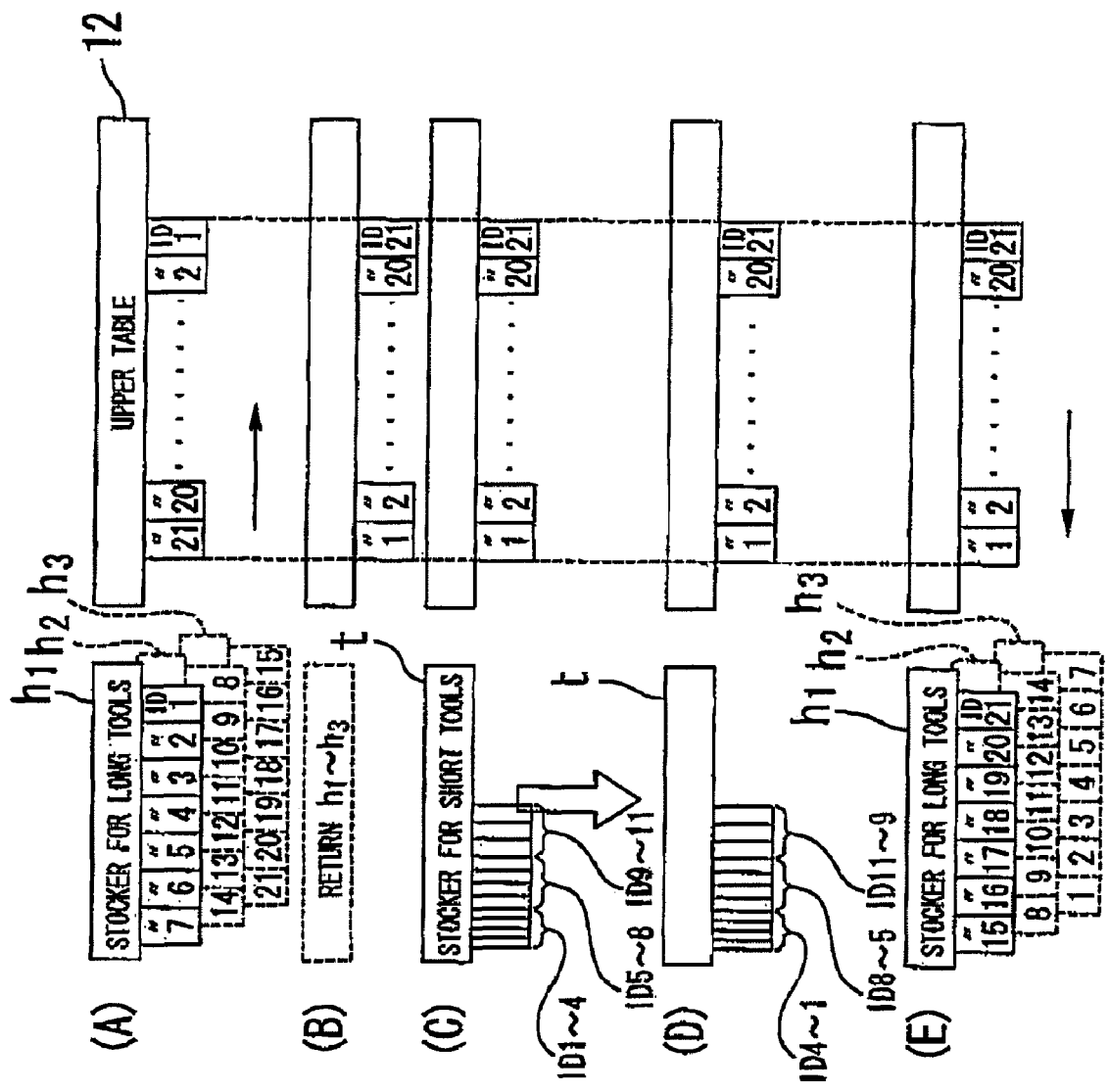
FIG. 19 is an operational explanatory view of a First Embodiment according to the Second Invention.
Figure 21:
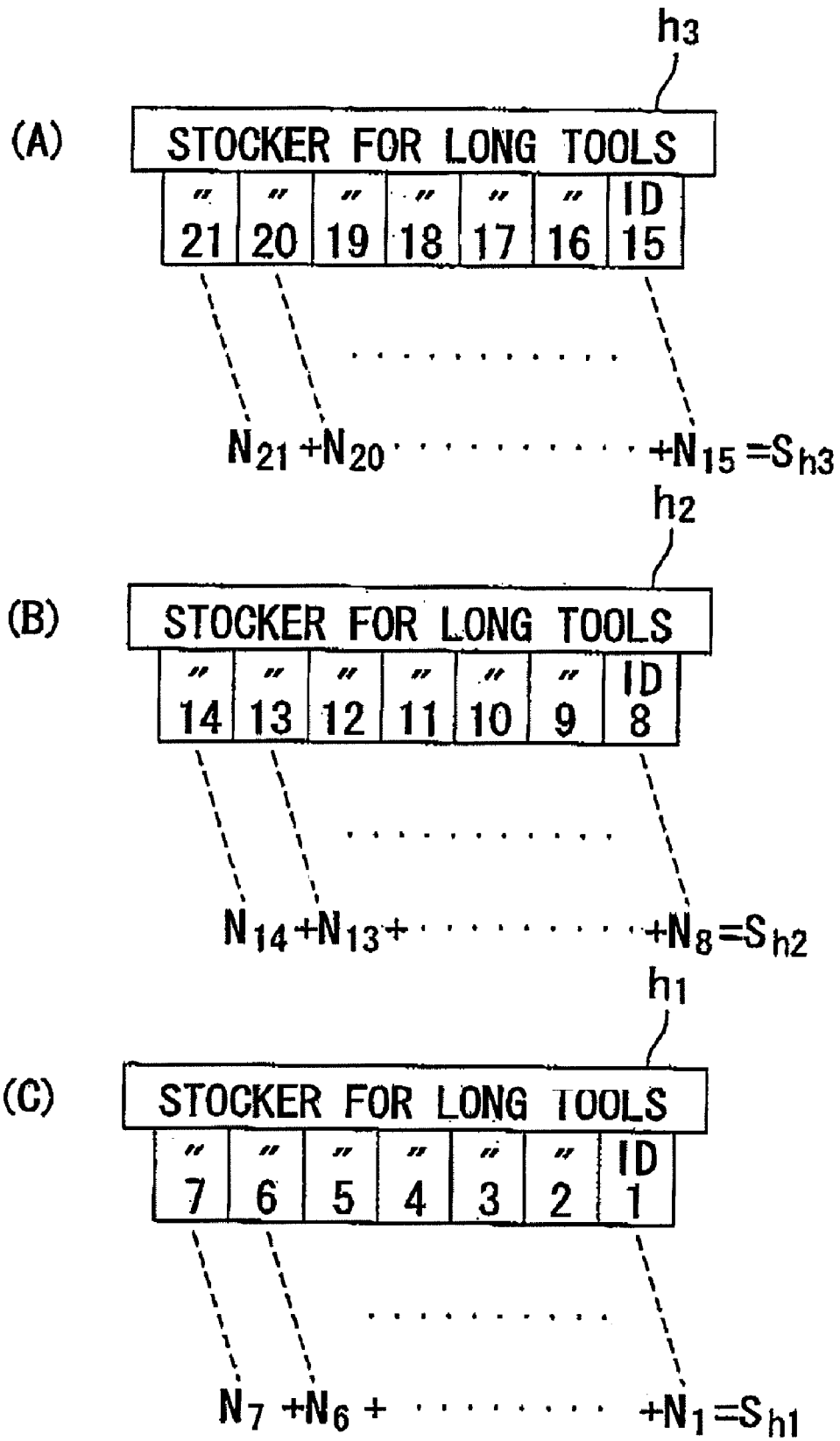
FIG. 21 is an operational explanatory view of one example of a Second Embodiment according to the Second Invention.
Figure 22:
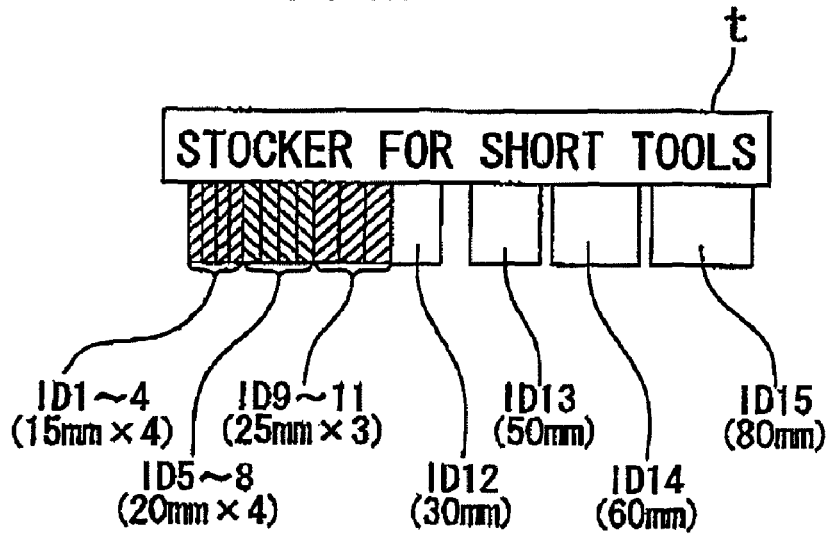
FIG. 22 is an operational explanatory view of another example of the Second Embodiment according to the Second Invention.

In the present invention, a method as illustrated in FIG. 19 and a method as illustrated in FIGS. 21, 22 as described later are implemented, thereby averaging of numbers of uses of tools can help to achieve uniformity of wear condition of tools, in a state where numbers of uses of tools are grasped, through a system, as described later, to count numbers of uses of each tool that actually bent a work (FIG. 14 to FIG. 17), or through a conventional system, which is disclosed in already mentioned Japanese Patent Application Laid-Open No. 61-99529, to count numbers of uses of tools in proportional to number of operations of a ram.

NC apparatus 20 (FIG. 9) of a press brake having the abovementioned configuration includes CPU20a, input/output means 20B, memory means 20C, machining information determining means 20D, number of uses of tool detecting means 20E, tool rearranging means 20F, total sum of number of uses of tools calculating means 20G, and tool stocker selecting means 20H.

CPU24A performs overall control of the entire apparatus as illustrated in FIG. 1 including machining information determining means 20D, number of uses of tool detecting means 20E, tool rearranging means 20F, in accordance with operating procedure (for example, corresponding to FIG. 18) for implementing the present invention.

The input/output means 20B constitutes an operating panel attached to the press brake, and has input means such as a keyboard, and output means such as a screen, as is well known, and allows product information or the like to be input, for example, manually or automatically using this operating panel 20B, and allows input results to be confirmed on the screen.

In this case, product information is, similarly, for example, CAD (Computer Aided Design) information, and includes information such as plate thickness, material, bend line length, bending angles, flange dimensions, etc. of a work W (FIG. 14), and these are organized as three-dimensional appearance view, and expansion view.

Figure 16:
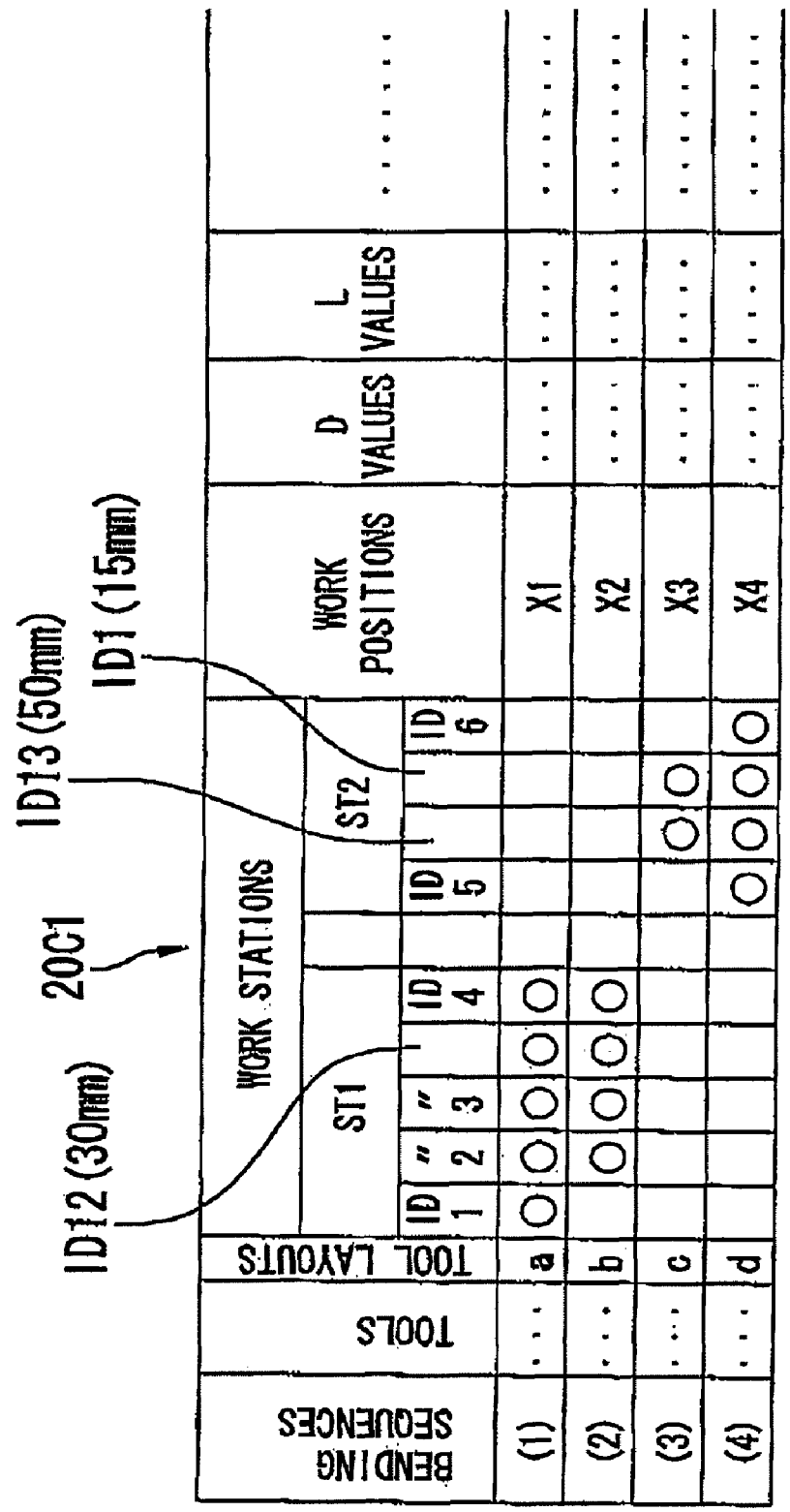
FIG. 16 is a diagram illustrating a machining information database 20c1 according to the Second Invention.

The memory means 20C (FIG. 9) stores programs for implementing the present invention, as well as storing information necessary for processing, as database 20C1, such as tools, tool layouts, work positions, other D values, L values for each bending sequence that machining information determining means 20D as described later has determined (FIG. 16).

Also, the memory means 20C (FIG. 9) stores, a region (e.g., FIG. 17) where actual numbers of uses of long tools, short tools stored in tool storing sections 2 (FIG. 10), 3 (FIG. 11) as described previously are accumulated, as a tool storage database 20c2.

Machining information determining means 20D (FIG. 9) determines bending sequences (1), (2), (3), and (4), based on product information input via the input/output means 20B, as well as determining tools that bend a work W for each bending sequence and tool layouts a, b, c, and d, work positions (right-left direction), other D values, L values, etc. (Steps 101 and 102 in FIG. 18).

Figure 14:
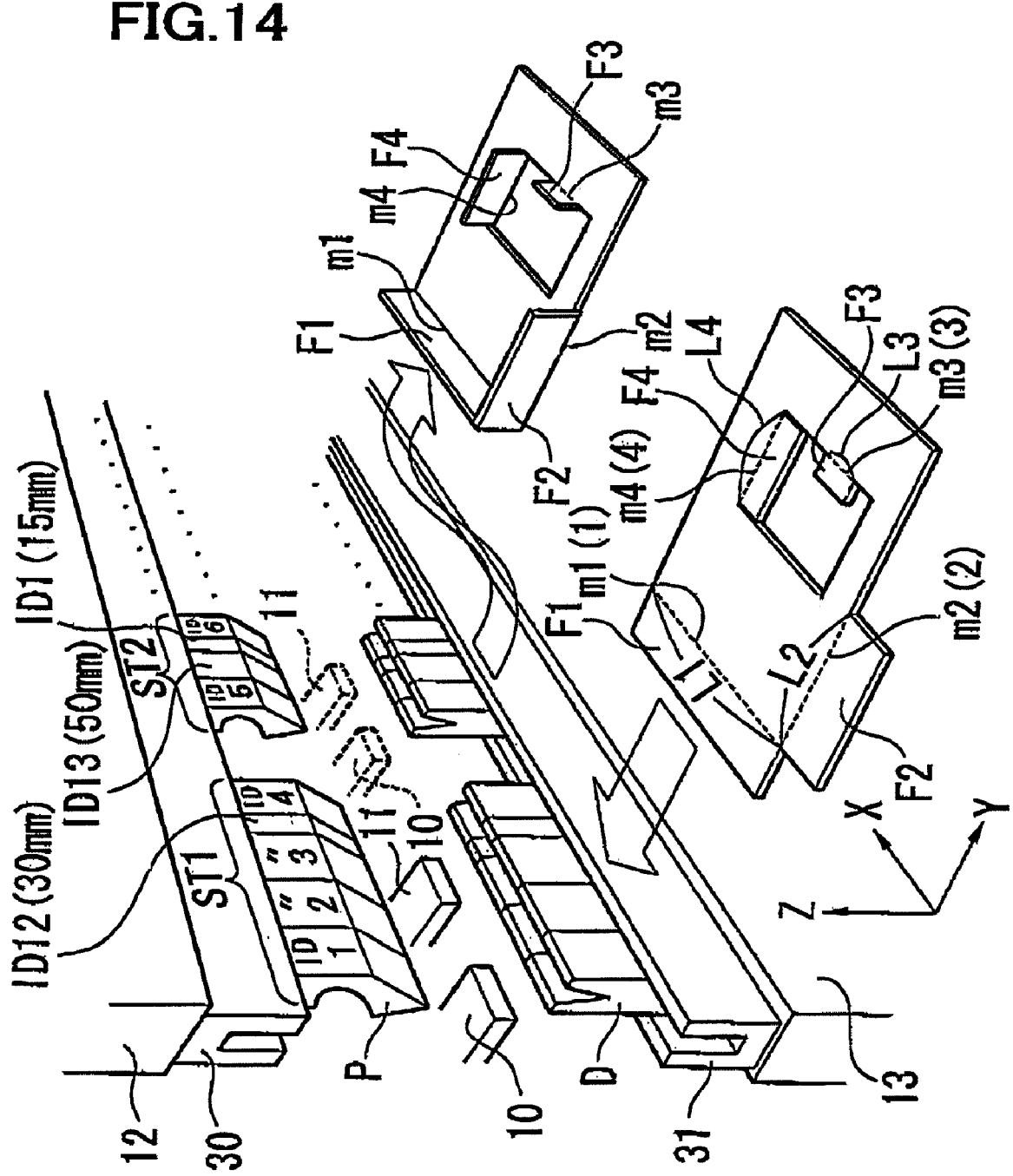
FIG. 14 is a view illustrating an example of bending according to the Second Invention.

For example, as illustrated in FIG. 14, bend lines m1, m2, m3, and m4 portions of a flat work W are subjected to bend processing in the sequence of (1), (2), (3), and (4), and finally, as illustrated in the figure, a product with flanges F1, F2, F3, and F4 being erected is machined (e.g. as disclosed in WO98/01243 (particularly FIG. 3 to FIG. 5)).

Figure 15:
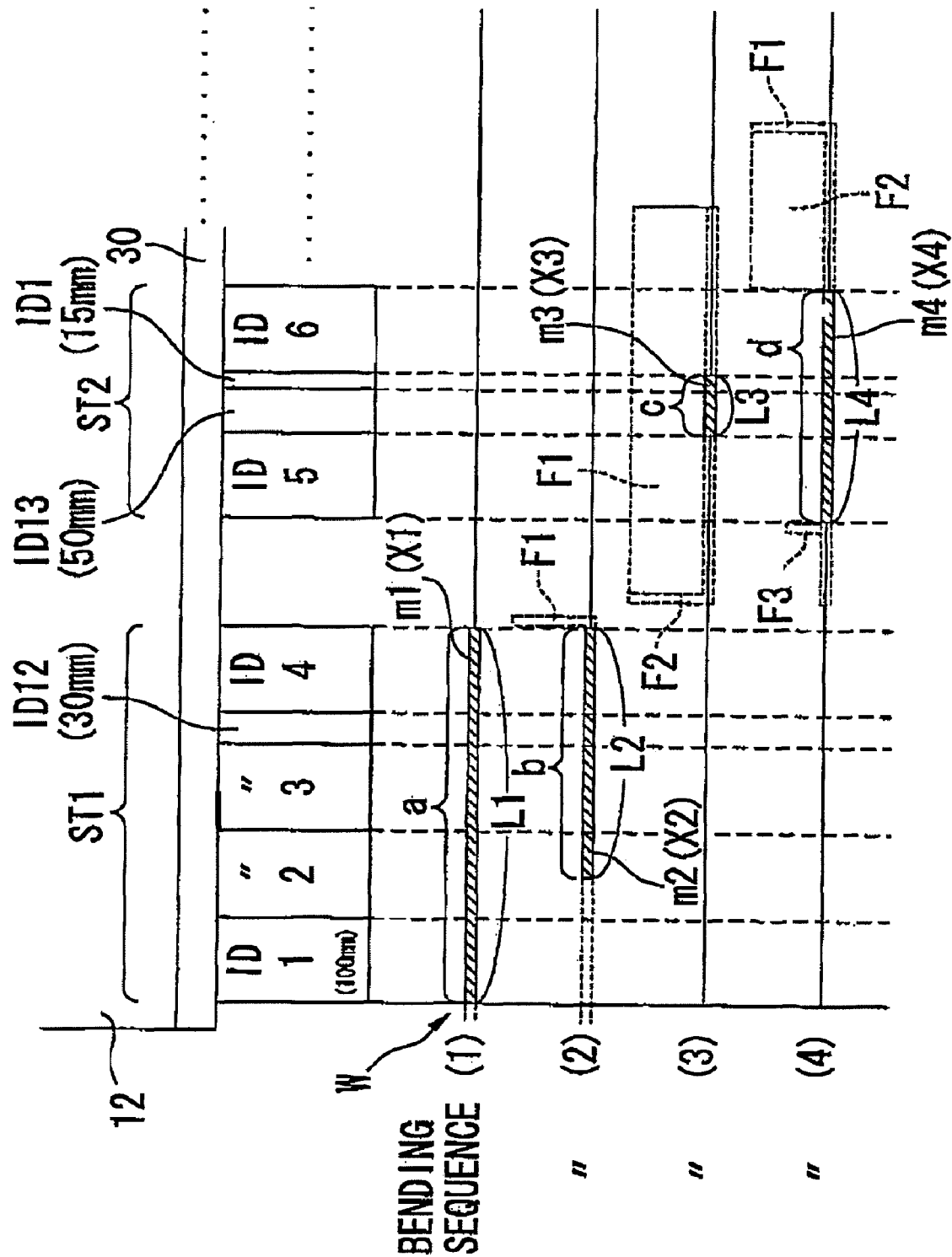
FIG. 15 is a diagram illustrating a relationship between tool layouts and bend positions of a work according to the Second Invention.

For the work W (FIG. 14) in this case, FIG. 15 illustrates relationship between work positions for each of bending sequences (1), (2), (3), and (4), when machining information determining means 20D (FIG. 9) determines bending sequences or the like and each of work stations ST1, ST2, and FIG. 16 illustrates the results of the determinations, respectively.

In FIG. 15, work stations ST1, ST2 are provided.

The work station ST1 includes, for example, metal molds with ID number 1 to 4 stored in a stocker h1 for long tools (FIG. 12) with cross-sectional shape of A (FIG. 10) at punch side, and similarly, tools with ID number 12 stored in a stocker t for short tools (FIG. 13).

Also, the work station ST2 includes, similarly, tools with ID number 5 to 6 stored in a stocker h1 for long tools (FIG. 12), and tools with ID number 13, 1 stored in a stocker t for short tools (FIG. 13).

In such work stations ST1 (FIG. 15) ST2, a work w is bent such that, bend lines m1, m2, m3, and m4 portions having bend lengths L1, L2, L3, and L4 as illustrated for each of bending sequences (1), (2), (3), and (4) be bent at predetermined positions X1, X2, X3, and X4, and in this case, tools that constitute each of tool layouts a, b, c, and d are used.

For example, all the tools that make up tool layout a in work station ST1 are used, because bend line m1 portion is bent in bending sequence (1).

In this case, actual uses of tools can be found from the actual bending of a work W with relevant tools (tools have come contact with work W, or tools have received reaction force from the work W).

For example, when a worker holds a foot pedal 7 down (FIG. 7), it activates hydraulic cylinders 14, 15, thereby a ram 12 descends, and when a tool comes into contact with the work W, or receives reaction force from the work W, then the readings of pressure gauges 5, 6 connected to hydraulic cylinders 14, 15 will rise.

Accordingly, when a detecting element 20c3 detects change in readings of the pressure gauges 5, 6, relevant metal mold is regarded to have been used, for example, in the case of bending sequence (1) (FIG. 15), each of long tools with ID number 1, 2, 3, and 4, and short tool with ID number 12 is used one time along with operation of a ram 12, via an adder 20c4 (FIG. 1), so that "1" is added to a relevant region of the tool management database 20c2 (FIG. 17) via the adder 20c4 (FIG. 9).

In this case, which tools have been used for each of bending sequences (1), (2), (3), and (4) can be found from tool layouts a, b, c, and d (corresponds to o marks in FIG. 16) that have been determined by machining information determining means 20D (FIG. 9) based on FIG. 15 as described previously.

The adder 20c4 can detect which tool has been used, while monitoring the machining information database 20c1, each time when a detection signal is received from the detecting element 20c3. Accordingly, the adder 20c4 (FIG. 9) adds "1" to relevant region of tool management database 20c2 (FIG. 17), as described previously.

In this case, as will be apparent from FIG. 15, there are not only the cases where bend line portion of work W comes into contact with total length of each tool (e.g. bending sequences (1), (3), (4)), but also the cases where work W contacts substantially one half (½) of total length (e.g., in bending sequence (2), bend length m2 portion is in contact with substantially on half (½) of long metal mold of ID number 2), and "1" can be assigned to all numbers of uses for these cases.

In FIG. 15, however, in the case where bend line portion of work W as described previously contacts substantially one half (½) of total length of tool (case of bending sequence (2)), 0.5 may be assigned to the number of use, and further "0" may be assigned (regarded as non-used).

In this way, the procedure how to count numbers of uses of tools is arbitrary, and thus a worker can preset it.

For example, at a stage when machining information such as tool layout has been determined (Step 102 in FIG. 18), a worker can set the procedure how to measure the numbers of uses of tools to the adder 20c4 via the input/output means 20B (FIG. 9), prior to starting of machining.

Number of uses of tool detecting means 20E (FIG. 9) detects numbers of uses of respective tools, referring to tool storage database 20c2.

The tool storage database 20c2 (FIG. 17) in this case is a region where to accumulate numbers of times that tools stored in tool storing section 2 (FIG. 10), 3 (FIG. 18) as described before were used for bending and is provided in memory means 20c (FIG. 9).

This tool mold storage database 20c2 (FIG. 17), as illustrated, has the same construction as the tool storing sections 2, 3 (FIG. 10 to FIG. 13), and is provided with regions where numbers of uses of each of tools in each stocker are accumulated.

With this configuration, when a ram 12 (FIG. 9) is operated, as described previously, "1" is added to predetermined number of use region of a tool storage database 20c2 via a detecting element 20c3 and an adder 20c4.

Tool rearranging means 20F rearranges tools in each stocker in the increasing order of number of use.

That is, when the number of use of tool detecting means 20E detects numbers of uses of respective tools, referring to tool storage database 20c2 (FIG. 17), this tool rearranging means 20F is supposed to reveal that, from the results of detections, tools with the larger ID number are used in the smaller number of times, whereas tools with the smaller ID number are used in the larger number of times (• marks in FIG. 25)

Thereby, the tool rearranging means 20F (FIG. 9) drives and controls tool storing sections 2, 3 and tool exchange devices 2A, 3A, rearranges tools in the increasing order of number of use, for example, as illustrated in FIG. 19.

That is, FIG. 19 is a method of rearranging tools in stockers h1 (FIG. 12), h2, h3, h4, and t (FIG. 13) in the increasing order of number of use.

In this case, first, stockers h1, h2, and h3 for long tools in A region out of regions in tool storing section 2 (FIG. 10) are shifted in sequence to the side of an upper table 12 (FIG. 19(A)), and subsequently all of tools with ID numbers 1 to 21 are inserted into the upper table 12 side (FIG. 19 (A)), using tool exchange device 2A.

In this status, using the tool exchange device 2A (FIG. 9) again, the order of long tools with ID numbers 1 to 21 inserted into the upper table 12 side is changed, and tools are rearranged such that to come closer to upper table 12 and ID numbers descend from 21 to 1 (FIG. 19(B)).

Also, in this stage, stockers h1, h2, and h3 for long tools that have become empty, will be once returned to original locations in tool storing section 2 (FIG. 10).

Next, stocker t for short tools in the A region out of regions in the same tool storing section 2 (FIG. 10) is shifted to the side of upper table 12 (FIG. 19(C)), and subsequently tools are rearranged in the increasing order of number of use using tool exchange device 2A (FIG. 9) for each tool group with the same length.

For example, for tool group with ID numbers 1 to 4 (FIG. 19 (C)), tools are rearranged such as, in the order of ID number 4 to 1 (FIG. 19 (D)).

Then, stocker t for short tools with rearranged tools will be returned to original location of tool storing section 2 (FIG. 10).

Finally (FIG. 19 (E)), long tools rearranged in the order of ID numbers 21 to 1 that have remained in upper table 12 side, will be shifted in sequence to empty stockers h1, h2, and h3 for long tools that: have been shifted from tool storing section 2 (FIG. 10) to upper table 12 side with seven tools for each stocker, using tool exchange device 2A (FIG. 9), and subsequently returned to original location (FIG. 10).

Figure 18:
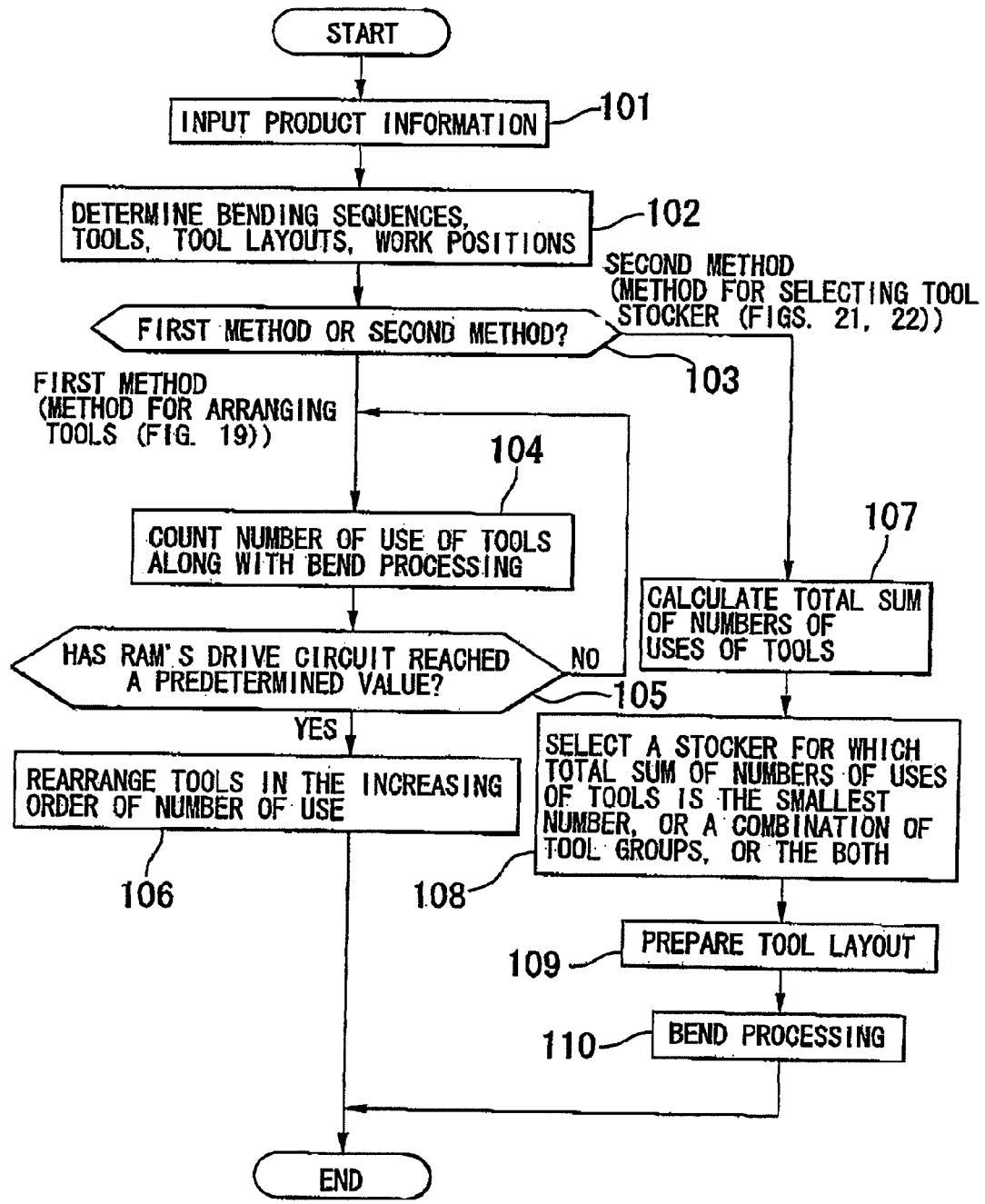
FIG. 18 is a flowchart for illustrating an operation of the Second Invention.

The method in FIG. 19 is carried out, provided that ram 12 (FIG. 9) is to be operated predetermined number of times, that is, it is carried out on a regular basis for each predetermined number of operations of ram 12 (YES of Step 105 to Step 106 in FIG. 18).

Figure 20:
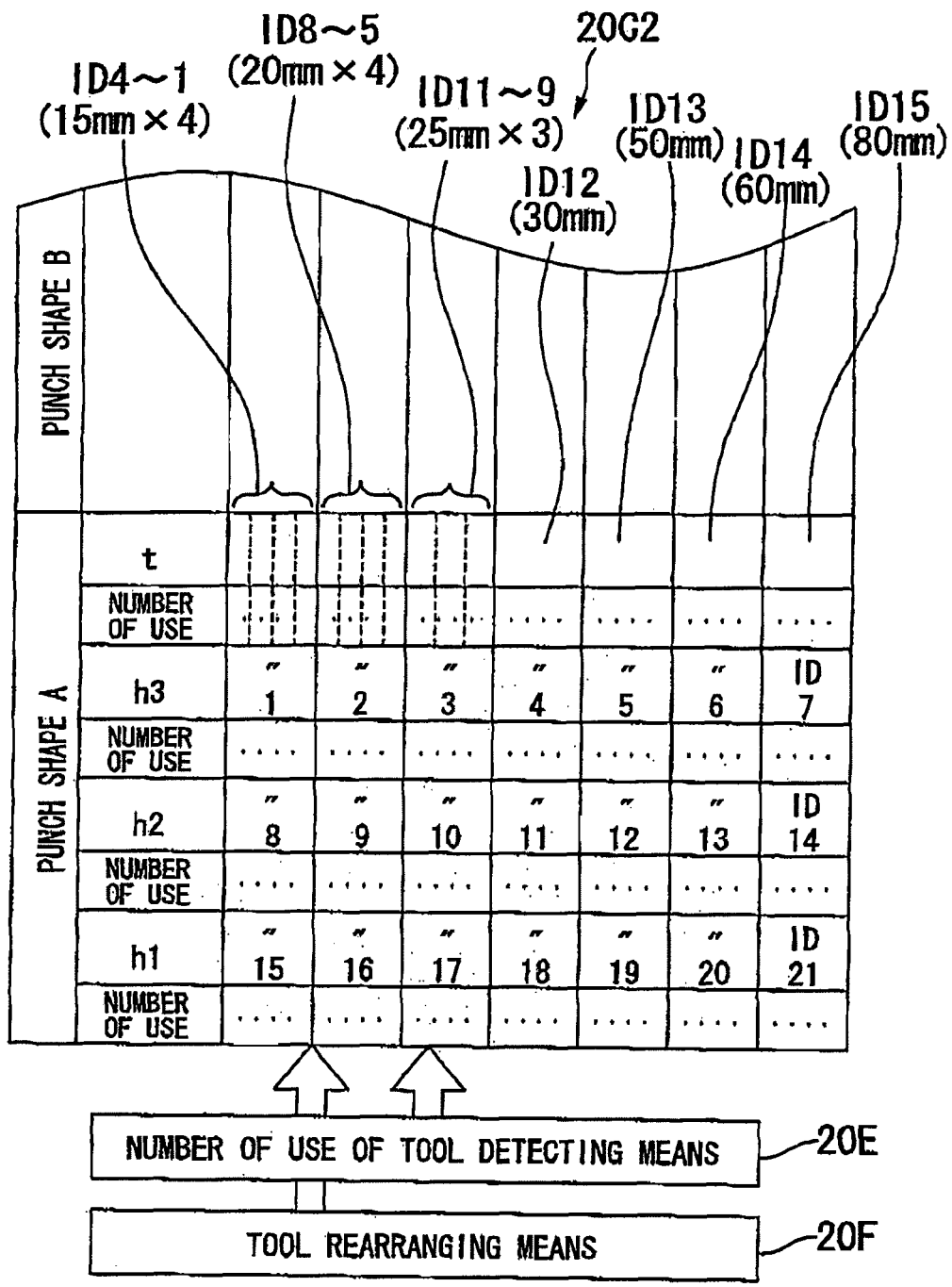
FIG. 20 is a diagram illustrating a tool storing database 20c2 after the completion of the operation of FIG. 19.

Also, the tool rearranging means 20F, as stated earlier, rearranges tools (FIG. 19), by driving and controlling the tool storing sections 2, 3 (FIG. 9) and tool exchange devices 2A, 3A (FIG. 9), and at the same time, as illustrated in FIG. 20, rearrange the content of tool storage database 20c2 as well.

Figure 17:
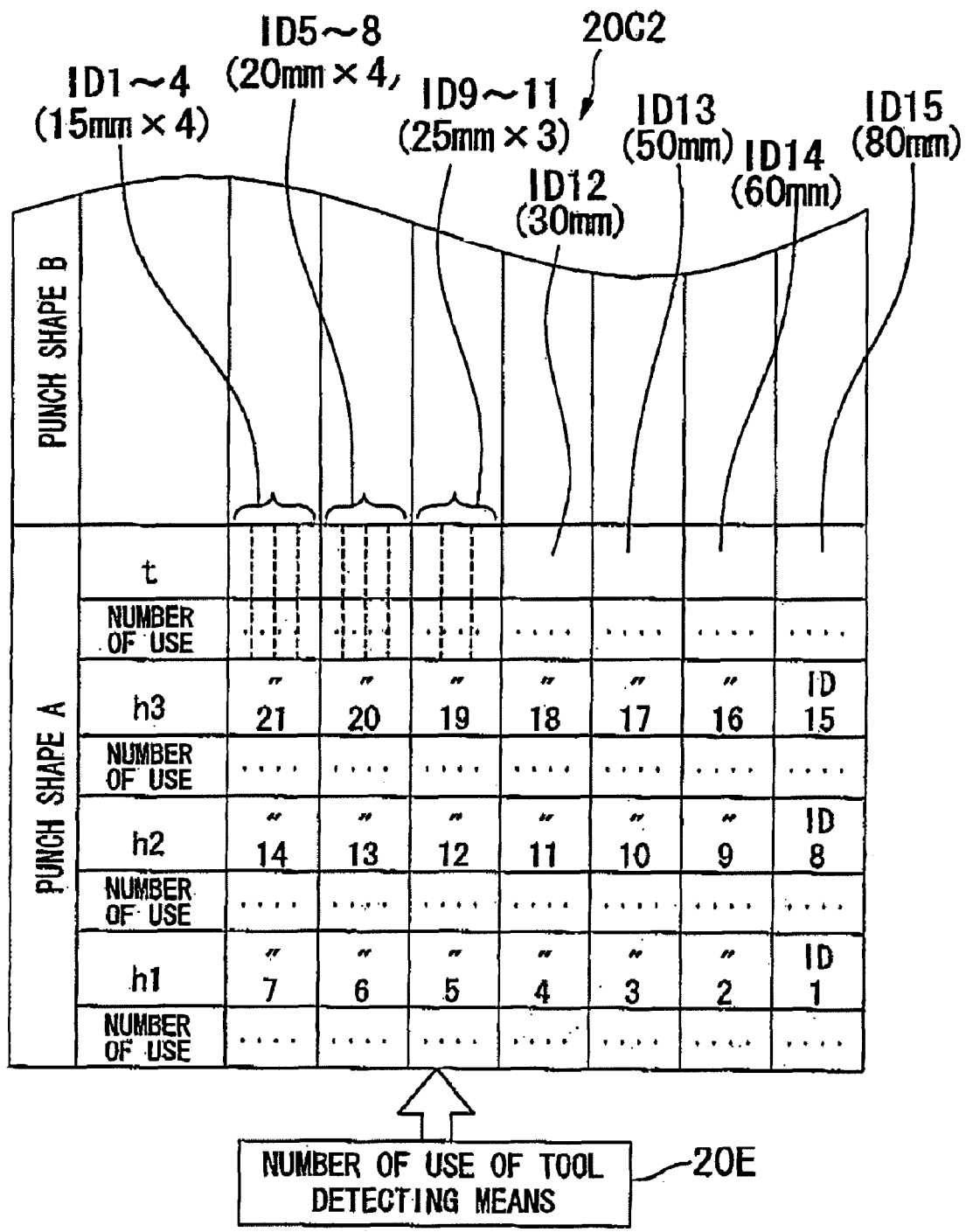
FIG. 17 is a diagram illustrating a metal mold storing database 20c2 according to the Second Invention.

That is, in FIG. 20, as will be apparent from comparing with FIG. 17 before rearranging tools, arrangement of tools in each of stockers h1, h2, and h3 is designed to be completely identical to actual arrangement of tools (the FIG. 19(D), FIG. 19(E)).

Further, along with it, in FIG. 20, numbers of uses are also rewritten, and the larger ID number, the less used; the smaller ID number, the more used, and accordingly, number of use of tools becomes smaller in the order of ID number 1 to 21.

For example, the number of use of tool with ID number 21 in stocker h1 for long tools is the smallest, whereas the number of use of tool with ID number 1 in stocker h3 for long tools is the largest.

According to the present invention of the aforementioned FIG. 19, the number of use of tools is averaged (FIG. 25), compared with conventional, by rearranging tools in increasing order of number of use, uniformity of wear condition of tools is achieved due to the averaging, so that it becomes possible to perform bend processing with good integrated uniform accuracy.

On the other hand, total sum of number of uses of tools calculating means 20G (FIG. 9) calculates the total sum of numbers of uses of tools, for each stocker (FIG. 21), and for each combination of tool groups (FIG. 22).

In addition, tool stocker selecting means 20H (FIG. 9) selects, for example, a stocker that has the smallest total sum of numbers of uses of tools calculated by the total sum of number of uses of tools calculating means 20G.

That is, FIG. 21 and FIG. 22 illustrate a method for selecting a stocker that has the smallest total sum of numbers of uses of tools (FIG. 21), or a combination of tool groups that have the smallest total sum of numbers of uses of tools (FIG. 22), alternatively the both (FIG. 21, FIG. 22), depending on predetermined lengths of tool layouts of work station determined by already described machining information determining means 20D (FIG. 9).

Figure 23:
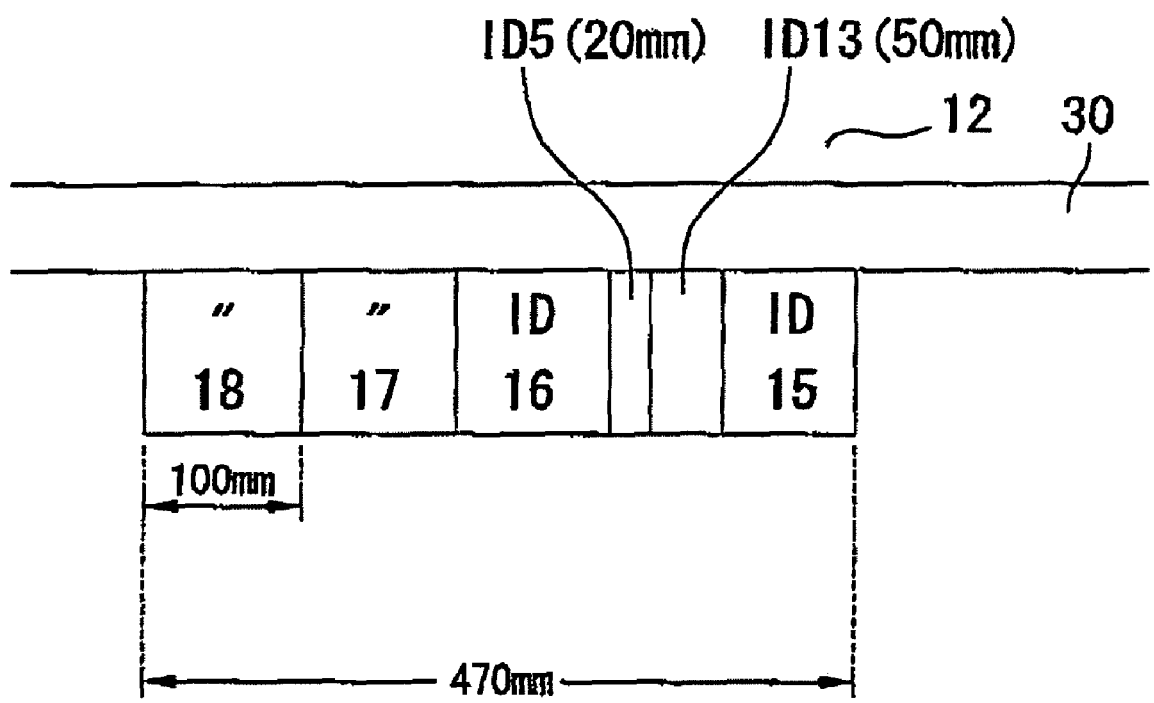
FIG. 23 is a diagram illustrating one example of tool layout prepared through FIG. 21 and FIG. 22.

In this case, for example, assume that a tool layout with length of 470 mm as shown in FIG. 23 be prepared.

Figure 24:
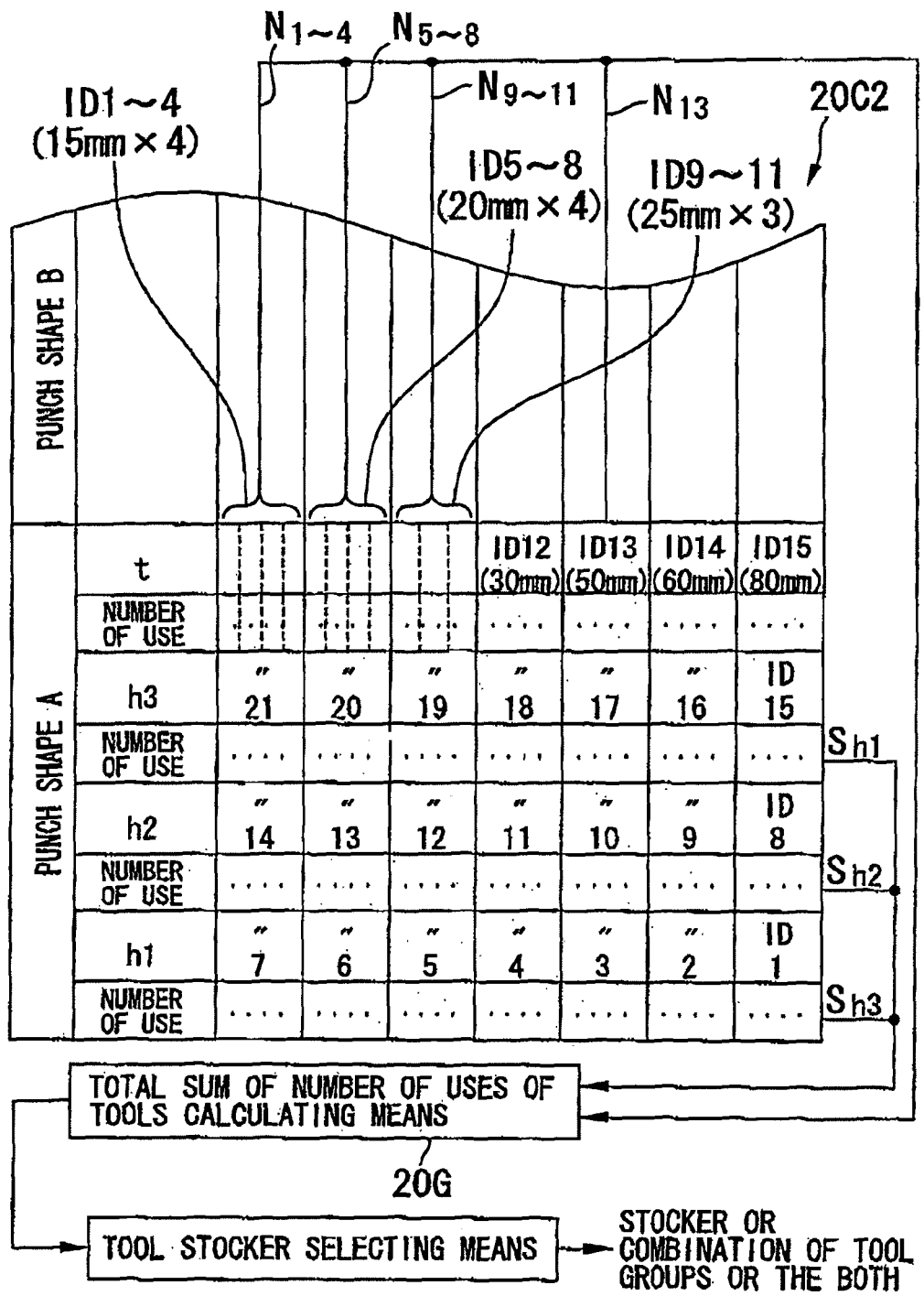
FIG. 24 is a diagram illustrating calculating/selecting operations through FIG. 21 and FIG. 22.

First, similarly, the total sum of number of uses of tools calculating means 20G calculates the total sums of numbers of uses of tools $S_{h1}$, $S_{h2}$, and $S_{h3}$ for each of stockers h1, h2, and h3, using tool management database 20c2 of FIG. 24 where numbers of uses of respective tools in stockers h1, h2, and h3 for long tools of, for example, A region out of regions in tool storing section 2 (FIG. 10) are accumulated.

For example, as illustrated in FIG. 21, letting the number of use of tool with ID number 1 stored in stocker h1 (FIG. 21 (C)) to be $N_1$, and the like, the total sums of numbers of uses of tools $S_{h1}$, $S_{h2}$, and $S_{h3}$ will be calculated as illustrated, for each of stockers h1, h2, and h3.

Then, in the case where the tool stocker selecting means 20H (FIG. 24) judges that the total sum of numbers of uses of tools $S_{h3}$ (FIG. 21 (A)) is the smallest, that is, it judges that the total sum $S_{h3}$ is the smallest with respect to a stocker h3 in which tools with larger ID number are stored, the stocker h3 will be selected.

Following this, as already described (FIG. 23), a portion occupying 400 nm (100 mm×4) out of tool layout with length of 470 mm is prepared using long tools, for example, with ID numbers 15 to 18 from the stocker h3.

Next, the total sum of number of uses of tools calculating means 20G calculates the total sums of numbers of uses of tools $C_1$ (FIG. 22), $C_2$, $C_3$, and $C_4$ for each combination of tool groups stored in the stocker t, using tool storage database 20c2 in FIG. 24 where numbers of uses of respective tools in stocker t for short tools of the A region out of the same tool storing section 2 (FIG. 10) are accumulated.

As stated previously, in the case of preparing tool layout with a length of 470 mm (FIG. 23), there are four cases, as illustrated in FIG. 14, as combinations of short tools occupying the length of 70 mm.

For example, in the case of a third combination (15 mm+15 mm+20 mm+20 mm) as illustrated in FIG. 22(C), letting numbers of uses of tool groups with ID numbers 1 to 4 (15 mm) to be $N_{1\ to\ 4}$, numbers of uses of tool groups with ID numbers 5 to 8 to be $N_{5\ to\ 8}$, total sum of numbers of uses of tools, as illustrated, will be $C_3$, and like that, then the total sum of number of uses of tools calculating means 20G calculates all four cases of total sums of numbers of uses of tools, $C_1$, $C_2$, $C_3$, and $C_4$.

Then, if tool stocker selecting means 20H judges that total sums of numbers of uses of tools C, is the smallest number (at minimum), that is, if it judges that the total sum $C_1$ is the smallest number with respect to a first combination (FIG. 22(A)), the first combination will be selected.

Further, as previously mentioned (FIG. 23), in the case where tool layout with length of 470 nm is prepared, short tools of tool group with ID numbers 5 to 8 (20 mm) that constitute this first combination (FIG. 22 (A)), and short tools of tool group (comprised of single tool in this case) with ID number 13 (50 mm) are used one piece for each group, respectively.

Figure 26:
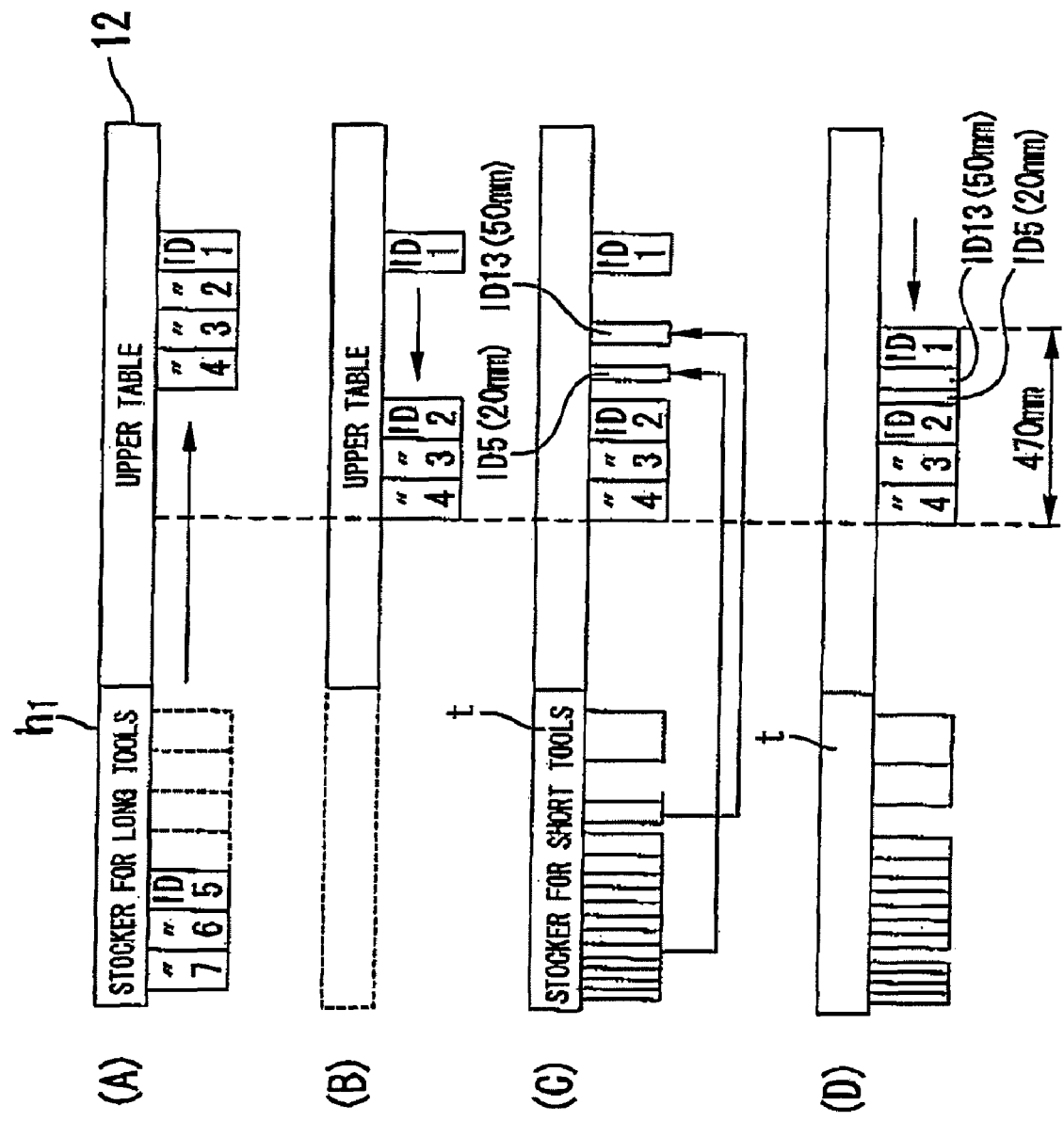
FIG. 26 is an operational explanatory view of the prior art of the Second Invention.
Figure 27:
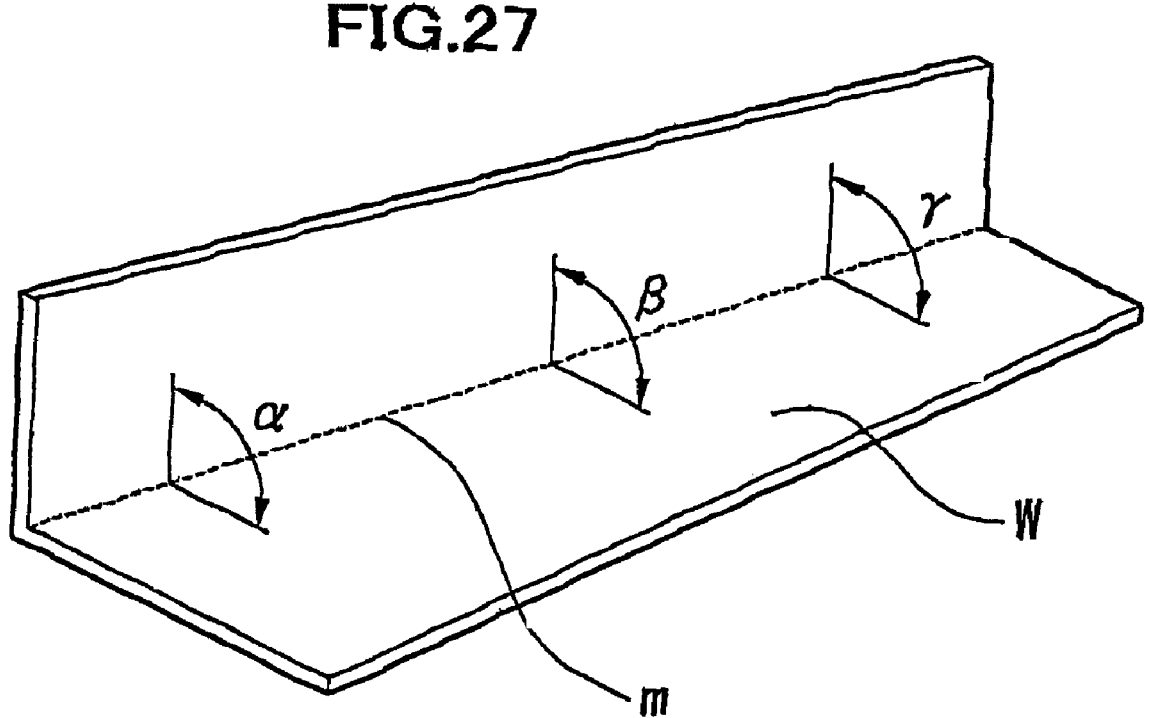
FIG. 27 is an explanatory view of the problem with the prior art of the Second Invention.

In this case, as stated previously, first, only long tools with ID numbers 15 to 18 (FIG. 23) are inserted into upper table 12 side (more specifically, punch holder 30 side), and subsequently long tools with ID numbers 16 to 18 are shifted to left side (corresponds to FIG. 26(B)), and clearance enough to accommodate short tools is formed, and following that, short tools with ID number 5 (FIG. 23) and 13 are inserted into this clearance (corresponds to FIG. 26 (C)), if short tools with the ID number 5 and 13 are gathered together to the left side (corresponds to FIG. 26 (D)), then tool layout of FIG. 23 will be prepared.

The above-mentioned method of FIG. 21 and FIG. 22 will be always carried out (Step 107 to Step 109 in FIG. 18), in the case where predetermined tool layout (FIG. 23) is to be prepared.

The example as described above, as illustrated in FIG. 23, represents a case where tool layout with length of 470 mm is prepared, and since four pieces of long tools of 100 mm and one piece each for short tools of 20 mm, 50 mm are required, then the tool stocker selecting means 20H selected the both stocker h1 (FIG. 21) for long tools that has the smallest number of use of tools and a first combination of short tool group (e.g., FIG. 22 (B)).

However, for example, in the case where tool layout with length of 200 mm is prepared (two pieces of long tools with 100 mm length are required), only stocker h1 (or h2, h3) for long tools that has the smallest number of use of tools is selected.

Also, for example, in the case where tool layout with length of 70 mm is prepared (each one piece of short tools with 20 nm and 50 mm lengths are required), only combination of tool group that has the smallest number of use of tools is selected.

According to the present invention of the above-mentioned FIG. 21, FIG. 22, the number of use of tools is averaged (FIG. 25), compared with conventional, by selecting the stoker with the lowest total sum of numbers of uses of tools or combination of tool groups, or the both, and uniformity of wear condition of tools is achieved due to the averaging, so that it becomes possible to perform bend processing with good integrated uniform accuracy.

Hereinafter, the operation of the Second Invention having the afore-mentioned configuration will be described based on FIG. 18.

(1) Operation Before Machining Information is Determined.

In Step 101 in FIG. 18, product information is input, and in Step 102, bending sequences, tools, tool layouts, work positions, etc. will be determined. That is, CPU20A (FIG. 9), detecting that product information has been input via input/output means 205, determines bending sequences, tools, tool layouts a, b, c, and d, work positions, etc. via machining information determining means 20D, and subsequently causes memory means 20c (FIG. 9) to store these machining information as database (FIG. 16).

(2) Operation to Judge Whether the First Method or the Second Method.

Judgment whether the first method or the second method is made in Step 103 of the FIG. 18. That is, when detecting that machining information has been determined by machining information determining means 20D, CPU20A (FIG. 9) judges whether to implement the first method after this (method for arranging tools of FIG. 19) or to implement the second method (method for selecting tool stockers of FIG. 21, FIG. 22).

Then, for example, if a worker manipulates keyboard, or the like of operating panel 20B, to display on a screen whether the first method or the second method, then based on this display, CPU20A (FIG. 9) judges whether a method that should be implemented is the first method (FIG. 19) or the second method (FIG. 21, FIG. 22).

(3) Operation of the First Method.

In the case of having judged that the first method to be implemented in Step 103 of FIG. 18, CPU20A counts numbers of uses of tools along with bend processing in Step 104; judges whether or not number of operations of ram 12 has reached a predetermined value in Step 105; in the case of having reached (YES), rearranges tools in the increasing order of number of use in Step 106.

That is, in the case where CPU20A (FIG. 9) judges that the first method (FIG. 19) to be implemented, it causes detecting element 20*c*3 (FIG. 9) and adder 20*c*4 to count numbers of uses of tools, as well as causing tool storage database 20*c*2 (FIG. 9) to accumulate the numbers of uses.

Then, CPU20A (FIG. 9), when judging via detecting element 20*c*3 that number of operations of ram 12 has reached a predetermined value, activates tool detecting means 20E and tool rearranging means 20F to rearrange tools in the increasing order of number of use, as described previously (FIG. 19)

(4) Operation of the Second Method.

In the case of having judged that the second method to be implemented in step 103 of FIG. 18, CPU20A calculates total sums of numbers of uses of tools in Step 107, selects a stocker that has the smallest total sum of numbers of uses of tools or a combination of tool groups or the both thereof in Step 108, prepares tool layout in Step 109, and performs bend processing in Step 110.

That is, CPU20A (FIG. 9), when judging that the second method (FIG. 21, FIG. 22) to be implemented, calculates total sums of numbers of uses of tools $S_{h1}$, $S_{h2}$, $S_{h3}$ and so on, as already mentioned, for each of stockers h1, h2, and h3, via total sum of number of uses of tools calculating means 20G (FIG. 9), depending on length of tool layout (e.g., FIG. 23), and further, selects a stocker that has the smallest total sum of number of use of tool, or the like via tool stocker selecting means 20H (FIG. 9).

Following this, CPU20A (FIG. 9) prepares tool layout with predetermined length (e.g., FIG. 23) using tools stored in the afore-mentioned selected stocker or the like, by operating tool storing sections 2, 3 and tool exchange devices 2A, 3A, and subsequently performs bend processing by operating hydraulic cylinders 14, 15 (FIG. 9).

INDUSTRIAL APPLICABILITY

The First Invention carries out proper tool management by measuring numbers of uses of individual tools that were actually bent, as well as being utilized for bending apparatus that performs bend processing with good integrated uniform accuracy and method for tool management, and finds applicability not only in automatic operation scheme in which mounting of tools that constitute work station onto upper table and lower table, accumulation of numbers of uses of tools are automatically performed respectively, but also manual operation scheme in which mounting of the tools and accumulation of numbers of uses of tools are manually performed respectively, and further for a scheme of displaying numbers of uses of relevant predetermined tools too, is applied not only to the case of displaying on a screen of an operating panel, but also to the case where a worker depresses a number-of-use confirmation button, thereby manually displaying on a screen of operating panel, and still further, finds applicability in the cases of not only a punch but also a die, as well as being applied not only to descending type press brake (FIG. 9) but also to ascending type press brake in which lower table 13 serving as ram is caused to ascend, so that work W be bent with the punch P and die D, which proves to be extremely effective.

In addition, the Second Invention is utilized for bending apparatus that performs bend processing with good integrated uniform accuracy and method for arranging tools and method for selecting tool stockers by achieving uniformity of wear condition of tools, and specifically, finds applicability not only in method for arranging tools (FIG. 19) to be performed on a regular basis in which tools are rearranged in the increasing order of number of use when number of operations of ram reaches a predetermined value, but also to method for selecting tool stockers (FIG. 21, FIG. 22) in which a stocker that has the smallest total sum of numbers of uses of tools or the like is selected, which is performed without fail when preparing a predetermined tool layout (FIG. 23), and further, finds applicability in the cases of not only punch but also die, and still further, is applied not only to descending type press brake (FIG. 9) but also to ascending type press brake in which lower table 13 serving as ram is caused to ascend, so that work W be bent with punch P and die D, and moreover, for counting scheme of numbers of uses of tools, finds applicability not only in a scheme for counting numbers of uses of each tool that actually bends work according to the present invention (FIG. 14 to FIG. 17), but also in a scheme for counting numbers of uses of tools in proportional to operations of ram, as disclosed in aforementioned conventional Japanese Patent Application Laid-open No. 61-99529, which proves to be extremely effective.

The invention claimed is:

1. A bending apparatus for bending a work using a punch mounted onto an upper table and a die mounted onto a lower table by operation of a ram including the upper table or the lower table, the apparatus comprising:

a machining information determining device that determines bending sequences based on product information, determines tools and tool layouts for each of the bending sequences, and determines work positions;

a tool management database that, based upon operations of the ram, determined work positions, tools, and tool layouts, determines and accumulates a number of uses of each tool, mounted on the ram, that actually bends the work and each tool, mounted on the ram, that does not bend the work;

a tool usage detector that detects the number of uses of each tool mounted on the ram; and a display that displays a number of uses of a relevant predetermined tool, when the detected number of uses of each tool becomes equal or approximate to a durable number of uses, or when a display command signal from a worker side is input.

2. The bending apparatus according to claim 1, wherein the tool management database includes a tool usage regions that constitutes a tool layout of each work station, and accumulates the numbers of uses of each tool, manually or automatically.

3. The bending apparatus according to claim 1, wherein the machining information determining device determines a tool layout, which is defined by an array of predetermined divided tools arranged at predetermined positions, in each work station.

4. The bending apparatus according to claim 1, wherein the machining information determining device determines a work position, based on a bending position of a work bend line portion having a predetermined bending length, in each work station.

5. A method for managing tools that uses a bending apparatus according to claim 1, the method comprising:
   determining bending sequences, based on product information, determining tools and tool layouts for each of the bending sequences, and determining work positions, and subsequently;
       accumulating numbers of uses of each tool that actually bent the work along with operation of the ram, based on the determined work positions, tools and tool layouts;
       detecting the accumulated number of uses of each tool; and
       displaying number of uses of relevant predetermined tool, when the detected number of uses of each tool becomes equal or approximate to a durable number of uses, or when a display command signal from a worker side is input.

6. The method for managing tools according to claim 5, wherein the numbers of uses of each tool that actually bent the work along with operation of the ram are accumulated manually or automatically.

7. A bending apparatus having a tool storing section for storing a tools including a punch and a die via a stocker, the apparatus comprising:
   a ram that mounts tools;
   a tool management database that, based upon operations of the ram, determined work positions, the tools, and tool layouts, determines and accumulates a number of uses of each tool, mounted on the ram, that actually bends the work and each tool, mounted on the ram, that does not bend the work;
   tool usage detector that detects a number of uses of tools within each stocker; and
   a tool re-arranger that rearranges the tools within each stocker in a predetermined order, based on the detected number of uses of tools.

8. The bending apparatus according to claim 7, wherein the tool re-arranger is configured to rearrange the tools within each stocker in an increasing order of number of uses.

9. A bending apparatus having a metal mold storing section for storing tools including a punch and a die via a stocker, the apparatus comprising:
   a ram that mounts tools;
   a tool management database that, based upon operations of the ram, determined work positions, the tools, and tool layouts, determines and accumulates a number of uses of each tool, mounted on the ram, that actually bends the work and each tool, mounted on the ram, that does not bend the work;
   a total sum tool usage calculator that calculates one of a total sum of numbers of uses of tools for each stocker and for each combination of tool groups; and
   a tool stocker selector that selects at least one of a predetermined stocker and a combination of predetermined tool groups based on the calculated total sum of a number of uses of tools.

10. The bending apparatus according to claim 9, wherein the tool stocker selector is configured to select a stocker for which the calculated total sum of numbers of uses of tools is one of a lowest number and a combination of tool groups for which the calculated total sum of numbers of uses of tools is the lowest number.

11. A method for arranging tools that uses a bending apparatus according to claim 7, the method comprising:
   detecting a number of uses of tools within each stocker; and
   subsequently rearranging the tools within each stocker in a predetermined order, based on the detected number of uses of the tools.

12. The method for arranging tools according to claim 11, wherein, the tools within each stocker are rearranged in an increasing order of number of uses, and this rearrangement is performed each time a number of operations of ram reaches a predetermined value.

13. A method for selecting a tool stocker that uses a bending apparatus according to claim 9, the method comprising:
   calculating at least one of a total sum of number of uses of tools for each stocker and for each combination of tool groups; and
   subsequently selecting at least one of a predetermined stocker and a predetermined combination of tool groups based on the calculated total sum of number of uses of tools.

14. The method for selecting tool stockers according to claim 12, wherein at least one of a stocker for which the calculated total sum of number of uses of tools is minimal and a group of tools for which the calculated total sum of number of uses of tools is minimal, is selected, and this selection is made each time a tool layout is prepared.

* * * * *

UNITED STATES PATENT AND TRADEMARK OFFICE
CERTIFICATE OF CORRECTION

| | | |
|---|---|---|
| PATENT NO. | : 8,001,824 B2 | Page 1 of 1 |
| APPLICATION NO. | : 11/917641 | |
| DATED | : August 23, 2011 | |
| INVENTOR(S) | : Akami et al. | |

It is certified that error appears in the above-identified patent and that said Letters Patent is hereby corrected as shown below:

At column 23, line 36 (claim 7, line 2) of the printed patent, please delete "a" after storing.

At column 23, line 44 (claim 7, line 11) of the printed patent, please add "a" before tool at the beginning of the line.

Signed and Sealed this
Third Day of April, 2012

David J. Kappos
*Director of the United States Patent and Trademark Office*